(12) United States Patent
Xi et al.

(10) Patent No.: US 11,837,187 B2
(45) Date of Patent: Dec. 5, 2023

(54) DISPLAY PANEL DRIVING METHOD AND DRIVING DEVICE, DISPLAY DEVICE, AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yanhui Xi, Beijing (CN); Tiankuo Shi, Beijing (CN); Xiaomang Zhang, Beijing (CN); Yan Sun, Beijing (CN); Shuo Zhang, Beijing (CN); Zhihua Ji, Beijing (CN); Wei Sun, Beijing (CN); Ming Chen, Beijing (CN)

(73) Assignees: BEIJING BOE OPTOELECTRONICS TECHNOLOGY PRESY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 26 days.

(21) Appl. No.: 17/782,281

(22) PCT Filed: May 31, 2021

(86) PCT No.: PCT/CN2021/097112
§ 371 (c)(1),
(2) Date: Jun. 3, 2022

(87) PCT Pub. No.: WO2022/001539
PCT Pub. Date: Jan. 6, 2022

(65) Prior Publication Data
US 2022/0383829 A1 Dec. 1, 2022

(30) Foreign Application Priority Data
Jun. 29, 2020 (CN) .......................... 202010609221.4

(51) Int. Cl.
G09G 3/36 (2006.01)
G02F 1/1347 (2006.01)

(52) U.S. Cl.
CPC ......... G09G 3/3607 (2013.01); G02F 1/1347 (2013.01); *G02F 2203/30* (2013.01);
(Continued)

(58) Field of Classification Search
CPC ......... G09G 3/3607; G09G 2300/0452; G09G 2320/0626; G02F 1/1347; G02F 2203/30
See application file for complete search history.

(56) References Cited

U.S. PATENT DOCUMENTS 8,405,672 B2    3/2013   Han et al.
9,087,485 B2    7/2015   Ahn et al.
(Continued)

FOREIGN PATENT DOCUMENTS

CN    101354873 A    1/2009
CN    101996601 A    3/2011
(Continued)

OTHER PUBLICATIONS

International Search Report in PCT/CN2021/097112 dated Aug. 18, 2021 in Chinese with English translation.
(Continued)

*Primary Examiner* — Kenneth B Lee, Jr.
(74) *Attorney, Agent, or Firm* — Collard & Roe, P.C.

(57) ABSTRACT

A driving method of a display panel, a driving device, a display device, and a storage medium are provided. The driving method of the display panel includes: obtaining an input image that is to be displayed; determining a display picture corresponding to the plurality of display pixels of the display screen according to the input image; determining a first dimming picture corresponding to the plurality of dimming pixels of the dimming screen according to the
(Continued)

input image, and processing the first dimming picture to obtain a second dimming picture; providing the display picture to make the dimming screen perform backlight modulation on the display screen according to the second dimming picture, and providing the second dimming picture to make the display screen display the input image according to the display picture.

20 Claims, 11 Drawing Sheets

(52) U.S. Cl.
CPC ............... *G09G 2300/0452* (2013.01); *G09G 2320/0626* (2013.01)

(56) References Cited

U.S. PATENT DOCUMENTS

| | | | |
|---|---|---|---|
| 9,886,915 B2 | 2/2018 | Chen | |
| 10,242,635 B2 | 3/2019 | Nakaya | |
| 10,789,987 B2 | 9/2020 | Chen | |
| 11,217,186 B2 * | 1/2022 | Xi | G09G 3/3426 |
| 2009/0027323 A1 | 1/2009 | Choi | |
| 2011/0279749 A1 * | 11/2011 | Erinjippurath | H04N 13/324 345/32 |
| 2013/0293589 A1 * | 11/2013 | Hwang | G06F 3/0485 345/173 |
| 2014/0267785 A1 | 9/2014 | Chen et al. | |
| 2022/0283466 A1 * | 9/2022 | Xi | G02F 1/133601 |
| 2022/0309984 A1 * | 9/2022 | Xi | G09G 3/2007 |

FOREIGN PATENT DOCUMENTS

| | | |
|---|---|---|
| CN | 102097068 A | 6/2011 |
| CN | 102187267 A | 9/2011 |
| CN | 104766569 A | 7/2015 |
| CN | 105719608 A | 6/2016 |
| CN | 106128382 A | 11/2016 |
| CN | 108510947 A | 9/2018 |
| CN | 111258135 A | 6/2020 |
| GB | 2464521 A | 4/2010 |
| KR | 10-2019-0035259 A | 4/2019 |

OTHER PUBLICATIONS

Written Opinion in PCT/CN2021/097112 dated Aug. 18, 2021 in Chinese.

* cited by examiner (a)

(b)

(c)

(a)

(b)

(c)

DISPLAY PANEL DRIVING METHOD AND DRIVING DEVICE, DISPLAY DEVICE, AND STORAGE MEDIUM

CROSS-REFERENCE TO RELATED APPLICATION

This application is the National Stage of PCT/CN2021/097112 filed on May 31, 2021, which claims priority under 35 U.S.C. § 119 of Chinese Application No. 202010609221.4 filed on Jun. 29, 2020, the disclosure of which is incorporated by reference.

TECHNICAL FIELD

At least one embodiments of the present disclosure relates to a driving method of a display panel, a driving device, a display device, and a storage medium.

BACKGROUND

Local dimming technology can change the brightness of the backlight in real time according to a displayed image, so as to save power consumption of the backlight and improve the contrast of image quality. A liquid crystal display panel can include two liquid crystal screens which overlap with each other, one of the two liquid crystal screens is used for displaying images and the other of the two liquid crystal screens is used for local dimming. The liquid crystal display panel can significantly improve its contrast, and the display effect of the liquid crystal display panel is comparable to that of an organic light-emitting diode (OLED) display panel. The liquid crystal display panel including two liquid crystal screens can be called a double-cell liquid crystal display panel, which can achieve high-precision dynamic dimming with a contrast ratio of more than 100,000 levels and millions of levels of partitions through double-screen control, and is highly favored by customers.

SUMMARY

At least one embodiment of the present disclosure provides a driving method of a display panel, the display panel comprises a dimming screen and a display screen, and the dimming screen is provided at a backlight side of the display screen and is configured to perform backlight modulation on the display screen, the dimming screen comprises a plurality of dimming pixels, and the display screen comprises a plurality of display pixels. The driving method comprises: obtaining an input image that is to be displayed; determining a display picture corresponding to the plurality of display pixels of the display screen according to the input image; determining a first dimming picture corresponding to the plurality of dimming pixels of the dimming screen according to the input image, and processing the first dimming picture to obtain a second dimming picture; providing the display picture to make the dimming screen perform backlight modulation on the display screen according to the second dimming picture, and providing the second dimming picture to make the display screen display the input image according to the display picture. Processing the first dimming picture to obtain the second dimming picture comprises: determining white dimming pixels and black dimming pixels in the first dimming picture; determining a white dimming pattern, consisting of white dimming pixels and having a width less than or equal to L dimming pixels in a first direction, in the first dimming picture, L being an integer greater than or equal to 2; performing brightness expansion processing on adjacent black dimming pixels that are adjacent to at least one side of the white dimming pattern in the first direction to adjust grayscale values of the adjacent black dimming pixels to obtain the second dimming picture.

For example, in the driving method of the display panel provided by the embodiment of the present disclosure, determining the white dimming pattern, consisting of the white dimming pixels and having the width less than or equal to L dimming pixels in the first direction, in the first dimming picture, comprises: for any one target black dimming pixel as a judgment target in the first dimming picture, judging whether l consecutive dimming pixels that start from the target black dimming pixel in the first direction and are directly adjacent to each other along a same direction are all white dimming pixels and whether a (l+1)-th pixel is a black dimming pixel, if yes, determining a white dimming pattern consisting of the l consecutive dimming pixels and having a width of l dimming pixels in the first direction. $1 \leq l \leq L$ and l is an integer.

For example, in the driving method of the display panel provided by the embodiment of the present disclosure, determining the white dimming pixels and the black dimming pixels in the first dimming picture, comprises: obtaining a first grayscale threshold; determining a dimming pixel with a grayscale value greater than the first grayscale threshold in the first dimming picture as a white dimming pixel, and determining a dimming pixel with a grayscale value less than the first grayscale threshold in the first dimming picture as a black dimming pixel.

For example, in the driving method of the display panel provided by the embodiment of the present disclosure, determining the white dimming pixels and the black dimming pixels in the first dimming picture, comprises: obtaining a second grayscale threshold and a third grayscale threshold; determining a dimming pixel with a grayscale value greater than the second grayscale threshold in the first dimming picture as a white dimming pixel, and determining a dimming pixel with a grayscale value less than the third grayscale threshold in the first dimming picture as a black dimming pixel. The second grayscale threshold is greater than the third grayscale threshold.

For example, in the driving method of the display panel provided by the embodiment of the present disclosure, one pixel of the dimming screen corresponds to four adjacent display pixels of the display screen arranged in two rows and two columns, and L is equal to 3.

For example, in the driving method of the display panel provided by the embodiment of the present disclosure, the adjacent black dimming pixels comprise a primary black dimming pixel, and the primary black dimming pixel is directly adjacent to the at least one side of the white dimming pattern in the first direction; performing brightness expansion processing on the adjacent black dimming pixels that are adjacent to the at least one side of the white dimming pattern in the first direction to adjust the grayscale values of the adjacent black dimming pixels, comprises: obtaining a primary grayscale value of the primary black dimming pixel and a plurality of grayscale values of a plurality of dimming pixels directly adjacent to the primary black dimming pixel as a plurality of reference primary grayscale values, obtaining a primary expansion coefficient corresponding to the primary black dimming pixel, based on the primary grayscale value, the plurality of reference primary grayscale values, and the primary expansion coefficient, obtaining a primary adjusted grayscale value for the primary black dimming pixel, assigning the primary adjusted grayscale value to the primary black dimming pixel.

For example, in the driving method of the display panel provided by the embodiment of the present disclosure, obtaining the primary expansion coefficient corresponding to the primary black dimming pixel, comprises: obtaining a first coefficient as the primary expansion coefficient for a white dimming pattern with a width equal to one dimming pixel in the first direction; obtaining a second coefficient as the primary expansion coefficient for a white dimming pattern with a width equal to 2 dimming pixels in the first direction; obtaining a third coefficient as the primary expansion coefficient for a white dimming pattern with a width equal to 3 dimming pixels in the first direction.

For example, in the driving method of the display panel provided by the embodiment of the present disclosure, the first coefficient, the second coefficient, and the third coefficient are 0.8, 0.8, and 0.9, respectively.

For example, in the driving method of the display panel provided by the embodiment of the present disclosure, based on the primary grayscale value, the plurality of reference primary grayscale values, and the primary expansion coefficient, obtaining the primary adjusted grayscale value for the primary black dimming pixel, comprises: selecting a maximum primary grayscale value among the primary grayscale value and the plurality of reference primary grayscale values, and obtaining the primary adjusted grayscale value for the primary black dimming pixel based on the maximum primary grayscale value and the primary expansion coefficient.

For example, in the driving method of the display panel provided by the embodiment of the present disclosure, the adjacent black dimming pixels further comprise a secondary black dimming pixel, the secondary black dimming pixel is directly adjacent to the primary black dimming pixel in the first direction and located at a side of the primary black dimming pixel away from the white dimming pattern; performing brightness expansion processing on the adjacent black dimming pixels that are adjacent to the at least one side of the white dimming pattern in the first direction to adjust the grayscale values of the adjacent black dimming pixels, further comprises: obtaining a secondary grayscale value of the secondary black dimming pixel and a plurality of grayscale values of a plurality of dimming pixels directly adjacent to the secondary black dimming pixel as a plurality of secondary reference grayscale values, obtaining a secondary expansion coefficient corresponding to the secondary black dimming pixel, obtaining a secondary adjusted grayscale value for the secondary black dimming pixel, based on the secondary grayscale value, the plurality of secondary reference grayscale values, and the secondary expansion coefficient, assigning the secondary adjusted grayscale value to the secondary black dimming pixel.

For example, in the driving method of the display panel provided by the embodiment of the present disclosure, obtaining the secondary expansion coefficient corresponding to the secondary black dimming pixel, comprises: obtaining a fourth coefficient as the secondary expansion coefficient for a white dimming pattern with a width equal to one dimming pixel in the first direction; obtaining a fifth coefficient as the secondary expansion coefficient for a white dimming pattern with a width equal to 2 dimming pixels in the first direction; obtaining a sixth coefficient as the secondary expansion coefficient for a white dimming pattern with a width equal to 3 dimming pixels in the first direction.

For example, in the driving method of the display panel provided by the embodiment of the present disclosure, the fourth coefficient, the fifth coefficient, and the sixth coefficient are 0.6, 0.6, and 0.6, respectively.

For example, in the driving method of the display panel provided by the embodiment of the present disclosure, obtaining the secondary adjusted grayscale value for the secondary black dimming pixel, based on the secondary grayscale value, the plurality of secondary reference grayscale values, and the secondary expansion coefficient, comprises: selecting a maximum secondary grayscale value among the secondary grayscale value and the plurality of secondary reference grayscale values, and obtaining the secondary adjusted grayscale value for the secondary black dimming pixel based on the maximum secondary grayscale value and the secondary expansion coefficient.

For example, in the driving method of the display panel provided by the embodiment of the present disclosure, the first direction is a row direction, a column direction, or a diagonal direction of pixels of the dimming screen.

For example, in the driving method of the display panel provided by the embodiment of the present disclosure, before driving the dimming screen to perform backlight modulation on the display screen according to the second dimming picture and driving the display screen to display the input image according to the display picture, the driving method further comprises: adjusting the display picture according to the second dimming picture to obtain an adjusted display picture. The display screen displays the input image according to the adjusted display picture.

At least one embodiment of the present disclosure further provides a driving device suitable for driving a display panel, the display panel comprises a dimming screen and a display screen, and the dimming screen is provided at a backlight side of the display screen and is configured to perform backlight modulation on the display screen, the dimming screen comprises a plurality of dimming pixels, and the display screen comprises a plurality of display pixels. The driving device comprises: an image acquisition circuit, configured to acquire an input image that is to be displayed; a display picture acquisition circuit, configured to determine a display picture corresponding to the plurality of display pixels of the display screen according to the input image; a dimming picture acquisition circuit, configured to determine a first dimming picture corresponding to the plurality of dimming pixels of the dimming screen according to the input image and process the first dimming picture to obtain a second dimming picture; an output circuit, configured to provide the display picture to make the dimming screen perform backlight modulation on the display screen according to the second dimming picture, and provide the second dimming picture to make the display screen display the input image according to the display picture. The dimming picture acquisition circuit being configured to process the first dimming picture to obtain the second dimming picture, comprises: determining white dimming pixels and black dimming pixels in the first dimming picture; determining a white dimming pattern, consisting of white dimming pixels and having a width less than or equal to L dimming pixels in a first direction, in the first dimming picture, L being an integer greater than or equal to 2; performing brightness expansion processing on adjacent black dimming pixels that are adjacent to at least one side of the white dimming pattern in the first direction to adjust grayscale values of the adjacent black dimming pixels to obtain the second dimming picture.

At least one embodiment of the present disclosure further provides a driving device, comprising: a processor; a memory, storing computer-executable instructions. In a case where the computer-executable instructions are executed by the processor, the processor is caused to execute the driving method of the display panel according to any one of the foregoing embodiments of the present disclosure.

At least one embodiment of the present disclosure further provides a display device, comprising: the driving device according to any one of the foregoing embodiments of the present disclosure and the display panel.

At least one embodiment of the present disclosure further provides a computer-readable storage medium on which computer-executable instructions are stored, the computer-executable instructions, when executed by a computer, cause the computer to execute the driving method of the display panel according to any one of the foregoing embodiments of the present disclosure.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
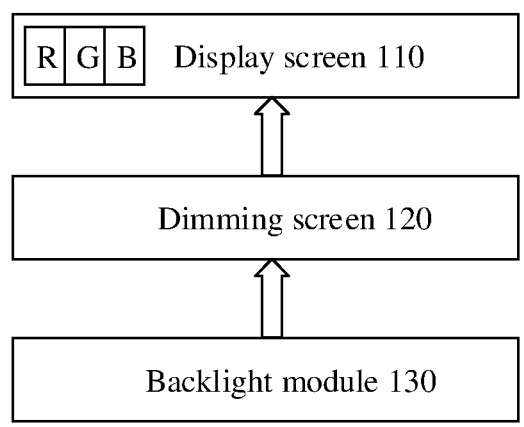
FIG. 1 is a schematic structural diagram of a display panel provided by at least one embodiment of the present disclosure.

In order to make objects, technical solutions, and advantages of the embodiments of the present disclosure more apparent, the technical solutions of the embodiments of the present disclosure will be described below in a clearly and fully understandable way with reference to the accompanying drawings of the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount, or importance, but distinguish various components. Similarly, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The embodiments of the present disclosure will be described in detail below with reference to the accompanying drawings, but the present disclosure is not limited to these specific embodiments. Furthermore, it should be noted that, in order to keep the following description of the embodiments of the present disclosure clear and concise, the present disclosure omits the detailed description of some well-known functions and well-known components.

At least one embodiment of the present disclosure provides a driving method of a display panel. The display panel includes a dimming screen and a display screen, and the dimming screen is provided at a backlight side of the display screen and is configured to perform backlight modulation on the display screen, the dimming screen comprises a plurality of dimming pixels, and the display screen comprises a plurality of display pixels. The driving method includes: acquiring an input image that needs to be displayed; determining a display picture corresponding to the plurality of display pixels of the display screen according to the input image; determining a first dimming picture corresponding to the plurality of dimming pixels of the dimming screen according to the input image, and processing the first dimming picture to obtain a second dimming picture; providing the display picture to make the dimming screen perform backlight modulation on the display screen according to the second dimming picture, and providing the second dimming picture to make the display screen display the input image according to the display picture. Herein, processing the first dimming picture to obtain the second dimming picture, comprises: determining white dimming pixels and black dimming pixels in the first dimming picture; determining a white dimming pattern, consisting of white dimming pixels and having a width less than or equal to L dimming pixels in a first direction, in the first dimming picture, L being an integer greater than or equal to 2; performing brightness expansion processing on adjacent black dimming pixels that are adjacent to at least one side of the white dimming pattern in the first direction to adjust grayscale values of the adjacent black dimming pixels to obtain the second dimming picture.

The driving method of the display panel provided by the above embodiment of the disclosure obtains the second dimming picture by performing brightness expansion processing on the first dimming picture of the dimming screen, and then makes the dimming screen perform backlight modulation on the display screen according to the second dimming picture, thereby avoiding or reducing the problem of color cast phenomenon when the display picture displayed by the display screen according to the input image includes a narrow line.

The display panel provided by at least one embodiment of the present disclosure will be described below. FIG. 1 is a schematic structural diagram of a display panel provided by at least one embodiment of the present disclosure.

As shown in FIG. 1, the display panel 10 includes a display screen 110, a dimming screen 120, and a backlight module 130. The dimming screen 120 is disposed between the backlight module 130 and the display screen 110. The backlight module 130 is disposed on the backlight side of the dimming screen 120 (that is, the side of the dimming screen 120 away from the display screen 110) and is configured to provide backlight to the dimming screen 120. The display screen 110 and the dimming screen 120 are stacked, and the dimming screen 120 is disposed on the backlight side of the display screen 110 (that is, the side of the display screen 110 close to the backlight module 130) and is configured to perform backlight modulation on the display screen 110 to display a gray-scale image (that is, a black-and-white image), thereby achieving local dimming. The display screen 110 is configured to display a color image using the gray-scale image displayed by the dimming screen as a light source. For example, the orthographic projection of the display region (active region) of the display screen 110 on the dimming screen 120 and the dimming region (active region) of the dimming screen 120 overlap with each other.

For example, in various embodiments of the present disclosure, the display panel 10 may be a liquid crystal display panel, and the display screen 110 and the dimming screen 120 may both be liquid crystal screens. The embodiments of the present disclosure do not limit the type, structure, and the like of the liquid crystal screen used for implementing the display screen 110 and the dimming screen 120, for example, the liquid crystal screen may be a vertical electric field type or a horizontal electric field type, for example, when the liquid crystal screen is the horizontal electric field type, the liquid crystal screen may be an in-plane switching (IPS) type, a fringe electric field switching (FFS) type, an advanced multi-dimensional switching (ADS) type, and the like. Similarly, the embodiments of the present disclosure do not limit the type, structure, and the like of the backlight module 130. For example, the backlight module 130 may be an edge-lit type or a direct-lit type, and the light-emitting source used may be a cold cathode fluorescent or a light-emitting diode (LED).

For example, in the display panel provided by the embodiments of the present disclosure, the dimming screen includes a plurality of dimming pixels, the plurality of dimming pixels are arranged in M rows and N columns, and the display screen includes a plurality of display pixels, the plurality of display pixels are arranged in αM rows and βN columns. There is a predetermined pixel correspondence between the plurality of dimming pixels of the dimming screen and the plurality of display pixels of the display screen, that is to say, a row of dimming pixels of the dimming screen may correspond to a row(s) of display pixels of the display screen, a column of dimming pixels of the dimming screen may correspond to β column(s) of display pixels of the display screen, and one dimming pixel of the dimming screen may correspond to α*β display pixel(s) of the display screen, where M≥3, N≥3, α and β are positive integers.

Figure 2:
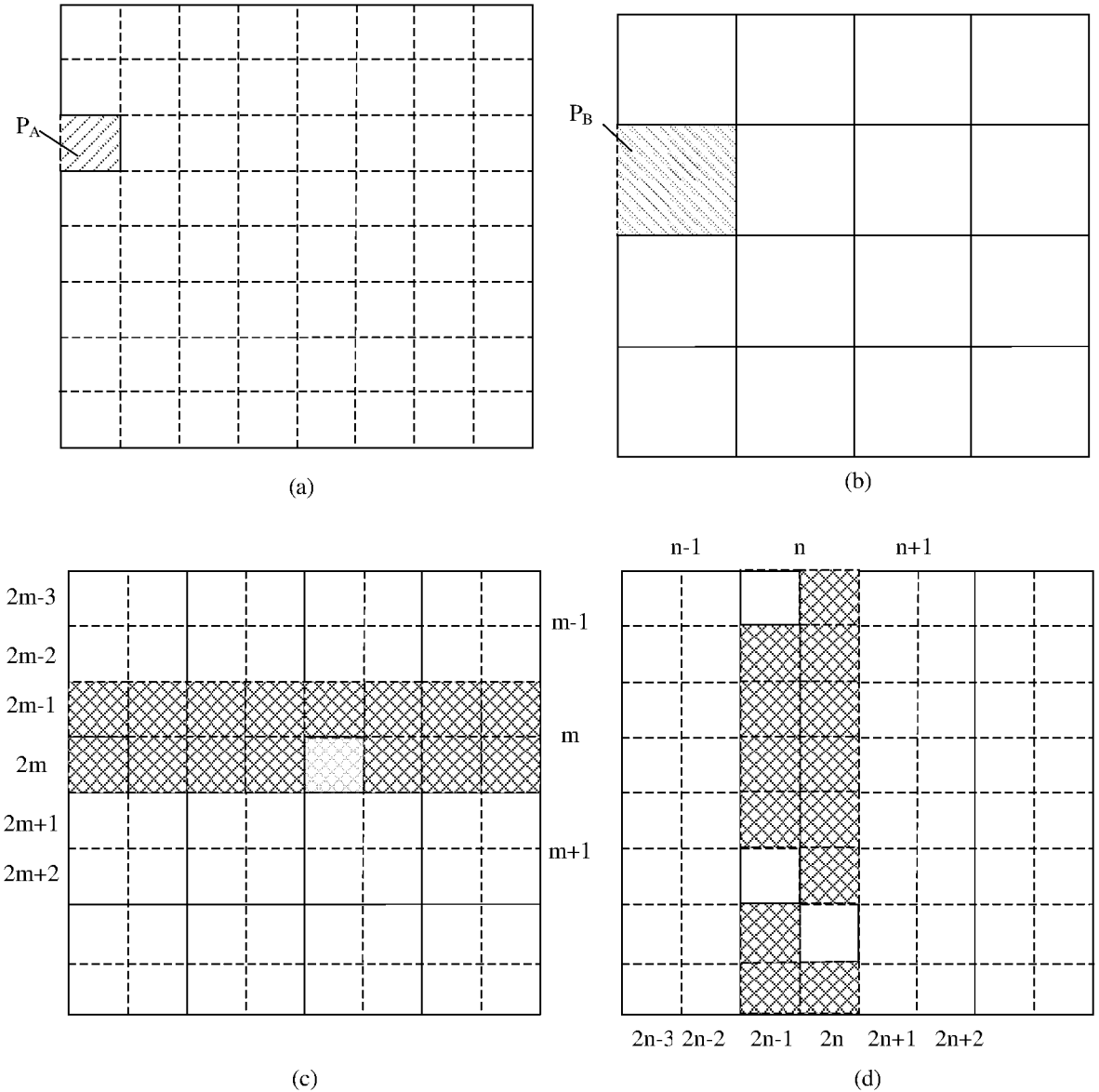
FIG. 2 is a schematic diagram of pixel distribution of a display screen and a dimming screen in the display panel shown in FIG. 1.

FIG. 2 is a schematic diagram of pixel distribution of a display screen and a dimming screen in the display panel shown in FIG. 1.

As shown in FIG. 2(a), the display region of the display screen 110 may include a plurality of display pixels $P_A$, the plurality of display pixels $P_A$ may be arranged in αM rows and βN columns, and α and β are positive integers. For simplicity, a plurality of gate lines and a plurality of data lines for the plurality of display pixels $P_A$, and pixel electrodes respectively included in the plurality of display pixels $P_A$ are omitted in the figure. These gate lines and these data lines cross each other to define a plurality of pixel regions for the plurality of display pixels $P_A$, and the shapes of these gate lines and/or data lines (such as straight lines or broken lines) define the shapes of these pixel regions. In each display pixel $P_A$, the shape of the pixel electrode may have substantially the same shape as the pixel region. For example, in some embodiments, the display screen 110 may be an ultra-high-definition (UHD) liquid crystal screen with a 4K resolution, and the display screen 110 may include 2160*3840 display pixels, in this case, M=1080, N=1920, α=2 and β=2.

As shown in FIG. 2(b), the dimming region of the dimming screen 120 may include a plurality of dimming pixels $P_B$, the plurality of dimming pixels $P_B$ may be arranged in M rows and N columns, M and N are positive integers, M≥3, N≥3. For simplicity, a plurality of gate lines and a plurality of data lines for the plurality of dimming pixels $P_B$, and pixel electrodes respectively included in the plurality of dimming pixels $P_B$ are omitted in the figure. These gate lines and these data lines cross each other to define a plurality of pixel regions for the plurality of dimming pixels $P_B$, and the shapes of these gate lines and/or data lines (such as straight lines or broken lines) define the shapes of these pixel regions. In each dimming pixel $P_B$, the shape of the pixel electrode may have substantially the same shape as the pixel region. For example, in some embodiments, the dimming screen 120 may be a full high-definition (FHD) liquid crystal screen with a 2K resolution, and the dimming screen 120 may include 1080*1920 dimming pixels, in this case, M=1080 and N=1920.

In some embodiments, as shown in FIG. 2(c), when α=2, one row of dimming pixels of the dimming screen 120 may correspond to two rows of display pixels of the display screen 110. For example, as shown in FIG. 2(c), the dimming pixels in the m-th row of the dimming screen 120 may correspond to the display pixels in the (2m−1)-th row and the display pixels in the 2m-th row of the display screen 110, 1≤m≤M. As shown in FIG. 2(d), when β=2, one column of dimming pixels of the dimming screen 120 may correspond to two columns of display pixels of the display screen 110. For example, as shown in FIG. 2(d), the dimming pixels in the n-th column of the dimming screen 120 may correspond to the display pixels in the (2n−1)-th column and the display pixels in the 2n-th column of the display screen 110, 1≤n≤N.

Referring to FIG. 2(c) and FIG. 2(d), it can be seen that when α=2 and β=2, one dimming pixel of the dimming screen 120 may correspond to four adjacent display pixels, arranged in two rows and two columns, of the display screen 110. For example, one dimming pixel, located in the m-th row and the n-th column, of the dimming screen 120 may correspond to four display pixels of the display screen 110, the four display pixels are located in the (2m−1)-th row and the (2n−1)-th column, the (2m−1)-th row and the 2n-th column, the 2m-th row and the (2n−1)-th column, and the 2m-th row and the 2n-th column, respectively.

It should be noted that although it is shown in FIG. 2(a) that the shape of the dimming pixel in the dimming screen is square, the embodiments of the present disclosure are obviously not limited to this, and the shape of the dimming pixel in the dimming screen may be other suitable shapes, such as hexagon, etc., besides square. Similarly, although the shape of the display pixel in the display screen shown in FIG. 2(b) is square, the embodiments of the present disclosure are obviously not limited to this, and the shape of the display pixel in the display screen may be other suitable shapes, such as hexagon, etc., besides square.

In addition, it should be noted that the first direction in the embodiment of the present disclosure may be the row direction, the column direction, or the diagonal direction of the dimming pixels of the dimming screen. For the sake of simplicity, the embodiments of the present disclosure will be described below only by taking a case that the first direction is the row direction of the dimming pixels as an example. For the case that the first direction is the column direction or the diagonal direction of the dimming pixels, reference may be made to the description of the embodiments of the present disclosure when the first direction is the row direction of the dimming pixels.

In addition, it should be noted that although FIG. 2(c) and FIG. 2(d) only show the case where the correspondence between the dimming pixels of the dimming screen and the display pixels of the display screen when α=2 and β=2, the cases where α and β take other values are similar. For example, when α=1, one row of dimming pixels of the dimming screen may correspond to one row of display pixels of the display screen, and when β=1, one column of dimming pixels of the dimming screen may correspond to one column of display pixels of the display screen. For example, when α=4, one row of dimming pixels of the dimming screen may correspond to four rows of display pixels of the display screen, and when β=4, one column of dimming pixels of the dimming screen may correspond to four columns of display pixels of the display screen.

The embodiments of the present disclosure do not limit the specific correspondence between the display pixels and the dimming pixels, but for the sake of simplicity, the embodiments of the present disclosure will be described below by taking α=2 and β=2 as an example. For the cases where α and β take other values, reference may be made to the description of the embodiments of the present disclosure when α=2 and β=2.

Figure 3:
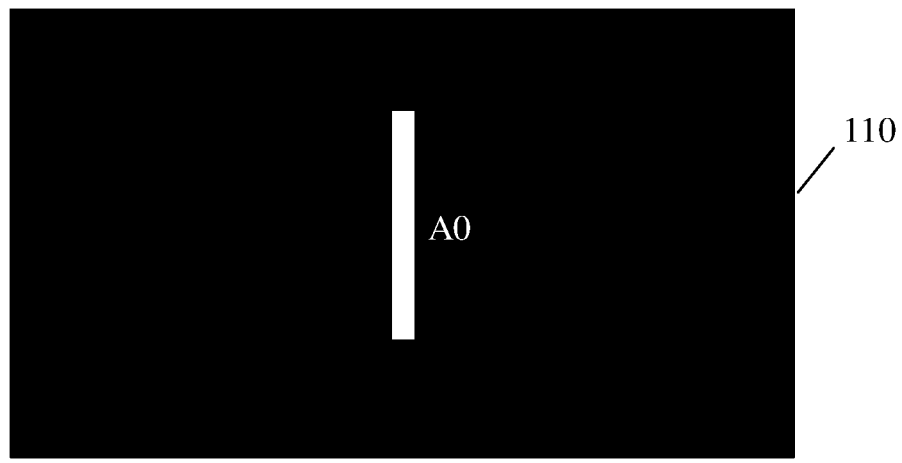
FIG. 3 is a macroscopic schematic diagram of a display picture displayed on the display screen and a dimming picture displayed on the dimming screen of the display panel provided by an embodiment of the present disclosure.
Figure 3:
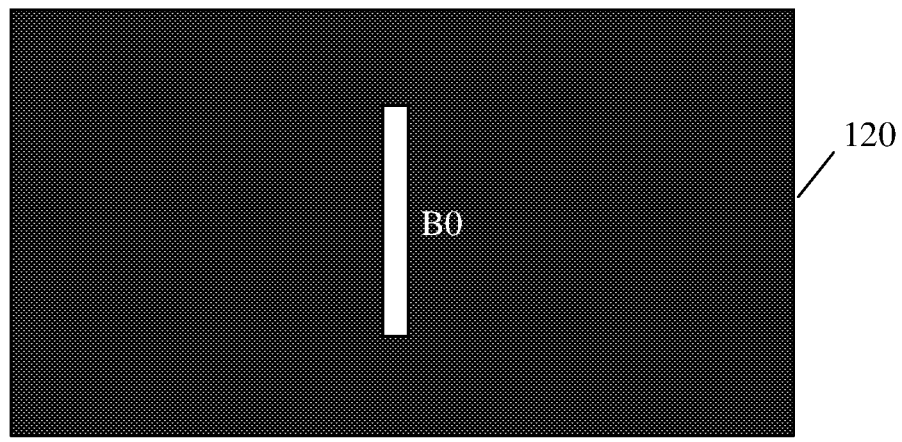

FIG. 3 is a macroscopic schematic diagram of the display picture displayed on the display screen and the dimming picture displayed on the dimming screen provided by the embodiment of the present disclosure.

As shown in FIG. 3, when the input image that needs to be displayed by the display panel includes a white line segment, the display picture displayed on the display screen 110 according to the input image includes a white display line segment A0, and the dimming picture displayed on the dimming screen 120 according to the input image includes a white dimming line segment B0. The orthographic projection of the white display line segment A0 of the display picture on the dimming screen 120 is aligned with the white dimming line segment B0 in the dimming picture.

It should be noted that the white display line segment A0 included in the display picture shown in FIG. 3 is composed of a plurality of white display pixels at the microscopic level, and the line width of the white display line segment A0 is less than a predetermined value. Similarly, the white dimming line segment B0 included in the dimming picture shown in FIG. 3 is also composed of a plurality of white dimming pixels at the microscopic level, and these white display pixels and these white dimming pixels meet a predetermined pixel correspondence in physical positions.

Figure 4:
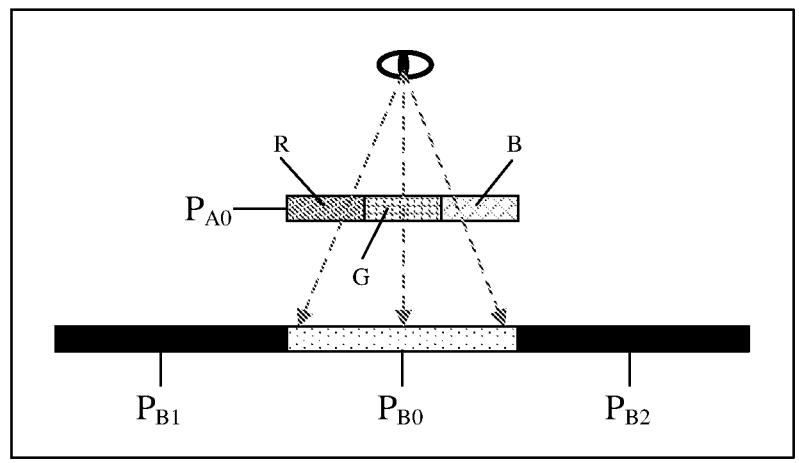
FIG. 4 is a schematic diagram of viewing effects of a display panel provided by an embodiment of the present disclosure under different view angles before processing.
Figure 4:
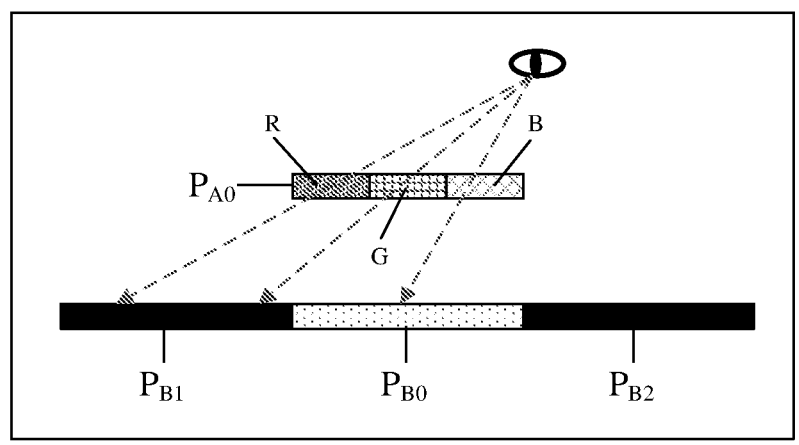
Figure 4:
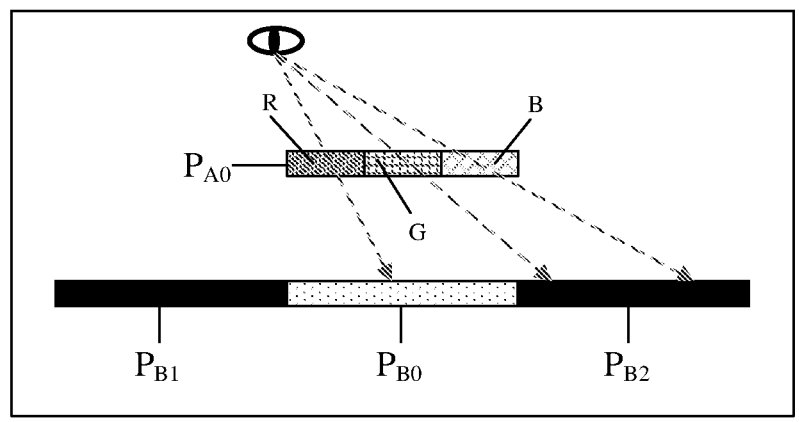
Figure 5:
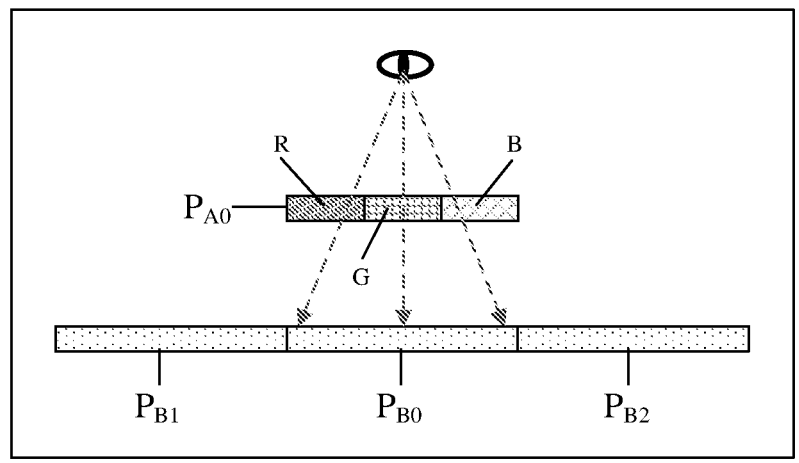
FIG. 5 is a schematic diagram of viewing effects of a display panel provided by an embodiment of the present disclosure under different view angles after processing.
Figure 5:
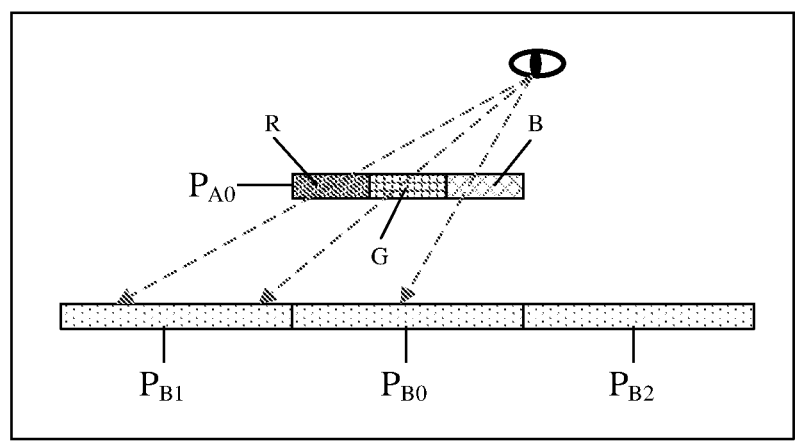
Figure 5:
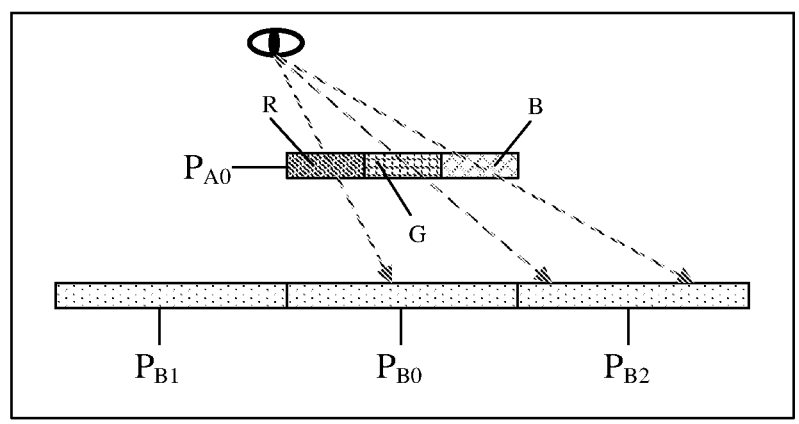

FIG. 4 is a schematic diagram of viewing effects of a display panel provided by an embodiment of the present disclosure under different view angles before processing. FIG. 5 is a schematic diagram of viewing effects of a display panel provided by an embodiment of the present disclosure under different view angles after processing.

As shown in FIG. 4 and FIG. 5, $P_{A0}$ represents a display pixel (for example, the white display pixel included in the white display line segment A0 in the display picture of the display screen 110 in FIG. 3) in the display picture of the display screen, and the display pixel $P_{A0}$ includes a red display sub-pixel R, a green display sub-pixel G, and a blue display sub-pixel B; $P_{B0}$ represents a dimming pixel (for example, the white dimming pixel included in the white dimming line segment B0 in the dimming picture of the dimming screen 120 in FIG. 3) in the dimming picture of the dimming screen, the dimming pixel $P_{B0}$ corresponds to the display pixel $P_{A0}$, $P_{B1}$ represents a dimming pixel directly adjacent to one side of the dimming pixel $P_{B0}$ in the first direction (i.e., the row direction of the dimming pixels), and $P_{B2}$ represents a dimming pixel directly adjacent to the other side of the dimming pixel $P_{B0}$ in the first direction (i.e., the row direction of the dimming pixels).

As shown in FIG. 4, before performing brightness expansion processing on the dimming picture of the dimming screen, the dimming pixel $P_{B0}$ is a white dimming pixel, and the dimming pixel $P_{B1}$ and the dimming pixel $P_{B2}$ are black dimming pixels. As shown in FIG. 5, after performing brightness expansion processing on the dimming picture of the dimming screen, the dimming pixels $P_{B0}$, $P_{B1}$, and $P_{B2}$ are all white dimming pixels.

Next, with reference to FIG. 4, the viewing effects of the display picture of the display screen before performing brightness expansion processing on the dimming screen will be described.

As shown in FIG. 4(a), under a front view angle, the projections of the red display sub-pixel R, the green display sub-pixel G, and the blue display sub-pixel B in the display pixel $P_{A0}$ on the dimming screen along the direction of the line of sight of the person all fall into the dimming pixel $P_{B0}$. Because the dimming pixel $P_{B0}$ is a white dimming pixel, before performing brightness expansion processing on the dimming picture of the dimming screen, the white display line segment A0 composed of the white display pixels $P_{A0}$ appears white in the display picture of the display screen under the front view angle. As shown in FIG. 4(b), under a left view angle, the projection of the blue display sub-pixel B in the display pixel $P_{A0}$ on the dimming screen along the direction of the line of sight of the person falls into the dimming pixel $P_{B0}$, while the projections of the red display sub-pixel R and the green display sub-pixel G in the display pixel $P_{A0}$ on the dimming screen along the direction of the line of sight of the person fall into the dimming pixel $P_{B1}$. Because the dimming pixel $P_{B0}$ is a white dimming pixel and the dimming pixel $P_{B1}$ is a black dimming pixel, before performing brightness expansion processing on the dimming picture of the dimming screen, the white display line segment A0 composed of the white display pixels $P_{A0}$ under the left view angle is bluish in the display picture of the display screen. As shown in FIG. 4(c), under a right view angle, the projection of the red display sub-pixel R in the display pixel $P_{A0}$ on the dimming screen along the direction of the line of sight of the person falls into the dimming pixel $P_{B0}$, while the projections of the green display sub-pixel G and the blue display sub-pixel B in the display pixel $P_{A0}$ on the dimming screen along the direction of the line of sight of the person fall into the dimming pixel $P_{B2}$. Because the dimming pixel $P_{B0}$ is a white dimming pixel and the dimming pixel $P_{B2}$ is a black dimming pixel, before performing brightness expansion processing on the dimming picture of the dimming screen, the white display line segment A0 composed of the white display pixels $P_{A0}$ in the right view angle is reddish in the display picture of the display screen.

Next, referring to FIG. 5, the viewing effects of the display picture of the display screen after performing brightness expansion processing on the dimming screen will be described.

After performing brightness expansion processing on the dimming picture of the dimming screen, as shown in FIG. 5(a), under a front view angle, the projections of the red display sub-pixel R, the green display sub-pixel G, and the blue display sub-pixel B in the display pixel $P_{A0}$ on the dimming screen along the direction of the line of sight of the person all fall into the dimming pixel $P_{B0}$. Because the dimming pixel $P_{B0}$ is a white dimming pixel, the white display line segment A0 composed of the white display pixels $P_{A0}$ appears white in the display picture of the display screen. As shown in FIG. 5(b), under a left view angle, the projection of the blue display sub-pixel B in the display pixel $P_{A0}$ on the dimming screen along the direction of the line of sight of the person falls into the dimming pixel $P_{B0}$, while the projections of the red display sub-pixel R and the green display sub-pixel G in the display pixel $P_{A0}$ on the dimming screen along the direction of the line of sight of the person fall into the dimming pixel $P_{B1}$, because the dimming pixel $P_{B0}$ is a white dimming pixel and the dimming pixel $P_{B1}$ is also a white dimming pixel, the white display line segment A0 composed of the white display pixels $P_{A0}$ appears white in the display picture of the display screen. As shown in FIG. 5(c), under a right view angle, the projection of the red display sub-pixel R in the display pixel $P_{A0}$ on the dimming screen along the direction of the line of sight of the person falls into the dimming pixel $P_{B0}$, while the projections of the green display sub-pixel G and the blue display sub-pixel B in the display pixel $P_{A0}$ on the dimming screen along the direction of the line of sight of the person fall into the dimming pixel $P_{B2}$, because the dimming pixel $P_{A0}$ is a white dimming pixel and the dimming pixel $P_{B2}$ is also a white dimming pixel, the white display line segment A0 composed of the white display pixels $P_{A0}$ appears white in the display picture of the display screen.

Comparing FIG. 4 and FIG. 5, it can be seen that before performing brightness expansion processing on the white dimming line segment B0 in the dimming picture of the dimming screen, when viewed from the left or right view angle, the projection of the white display pixel in the white display line segment A0 in the display picture on the dimming screen along the direction of the line of sight of the person will partially falls into the position of the black dimming pixels in the dimming picture, so that the white display line segment A0 in the display picture of the display screen will appear color cast phenomenon when viewed from the left or right view angle. After performing brightness expansion processing on the white dimming line seg-ment B0 in the dimming picture of the dimming screen, when viewed from the left or right view angle, the projection of the white display pixel in the white display line segment A0 in the display picture on the dimming screen along the direction of the line of sight of the person all falls into the position of the white dimming pixels in the dimming picture, so that the white display line segment A0 in the display picture of the display screen does not appear the color cast phenomenon when viewed from the left and right view angles.

Through research, the inventor has found that the narrower the white display line segment in the display picture of the display screen provided by the embodiment shown in FIG. 2, the more serious the color cast phenomenon, and when the width of the white display line segment in the display picture exceeds 4 display pixels, the color cast phenomenon hardly appears again, so that the embodiments of the present disclosure only process the white display line segment whose width is less than or equal to 4 display pixels in the display picture.

For example, in the embodiments of the present disclosure, in a case where one row of dimming pixels of the dimming screen corresponds to two rows of display pixels of the display screen and one column of dimming pixels of the dimming screen corresponds to two columns of display pixels of the display screen, when the width of the white display line segment in the display picture in the first direction is 4 display pixels, the width of the white dimming line segment in the dimming picture in the first direction is 2 or 3 dimming pixels according to different positions of the white display line segment in the display picture. When the width of the white display line segment in the display picture in the first direction is 3 display pixels, the width of the white dimming line segment in the dimming picture in the first direction is 2 dimming pixels according to the different positions of the white display line segment in the display picture. When the width of the white display line segment in the display picture in the first direction is 2 display pixels, the width of the white dimming line segment in the dimming picture in the first direction is 1 dimming pixel or 2 dimming pixels according to the different positions of the white display line segment in the display picture. When the width of the white display line segment in the display picture in the first direction is 1 display pixel, the width of the white dimming line segment in the dimming picture in the first direction is 1 dimming pixel according to the different positions of the white display line segment in the display picture.

Therefore, in the embodiments of the present disclosure, in a case where one row of dimming pixels of the dimming screen corresponds to two rows of display pixels of the display screen and one column of dimming pixels of the dimming screen corresponds to two columns of display pixels of the display screen, processing the white display line segment with a width in the first direction less than or equal to 4 display pixels in the display picture is equivalent to processing the white dimming line segment with a width in the first direction less than or equal to 3 dimming pixels in the dimming picture.

Figure 6A:
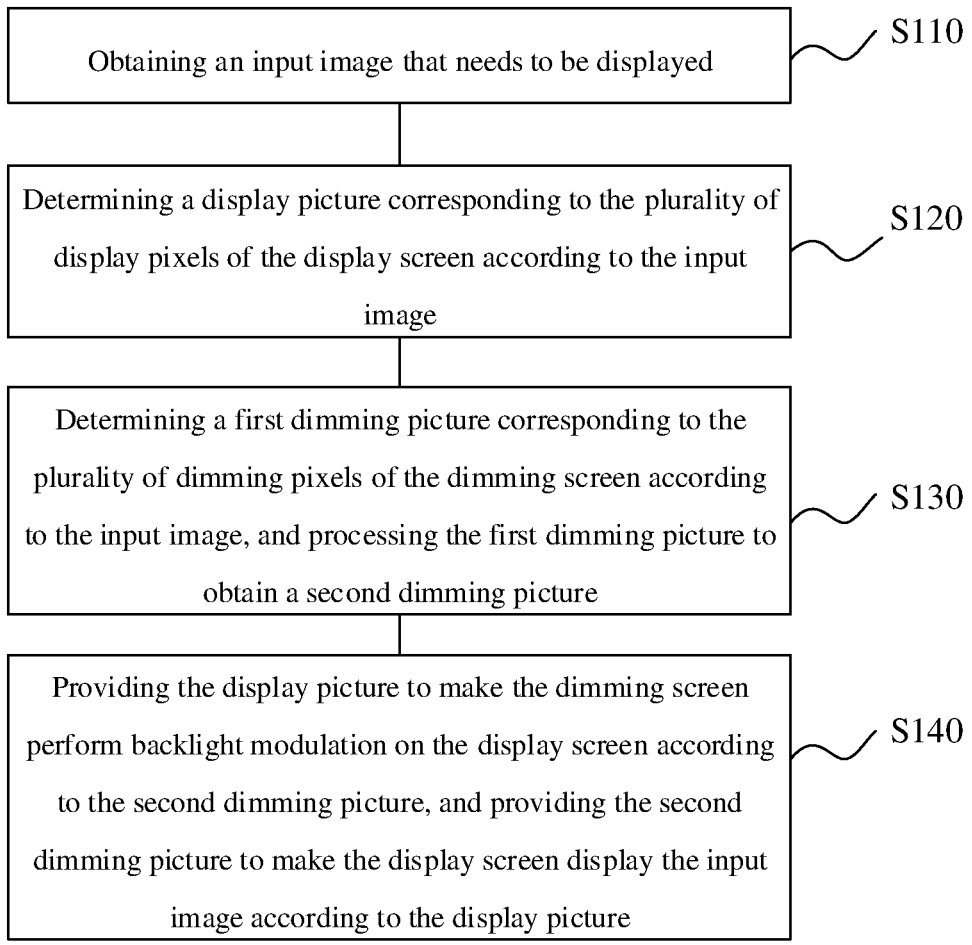
FIG. 6A is a flowchart of a driving method of a display panel provided by an embodiment of the present disclosure.
Figure 6B:
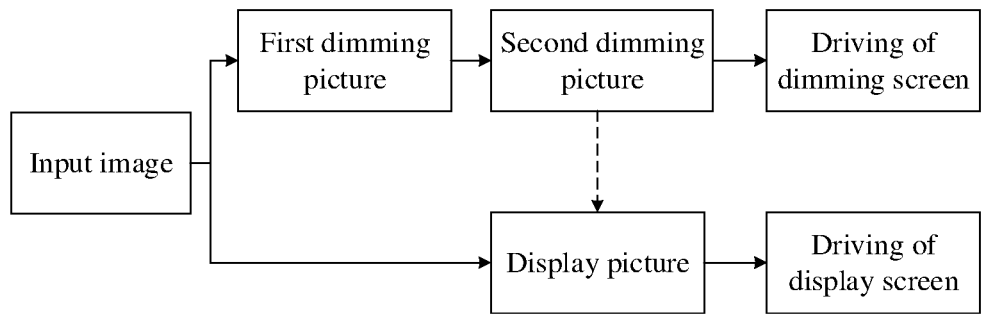
FIG. 6B is another schematic diagram of the driving method shown in FIG. 6A.

FIG. 6A is a flowchart of a driving method of a display panel provided by an embodiment of the present disclosure, and FIG. 6B is another schematic diagram of the driving method. For example, the driving method may be used to drive the display panel provided by the embodiment of the present disclosure.

As shown in FIG. 6A and FIG. 6B, the driving method may include the following steps:

Step S110: obtaining an input image that needs to be displayed;

Step S120: determining a display picture corresponding to the plurality of display pixels of the display screen according to the input image;

Step S130: determining a first dimming picture corresponding to the plurality of dimming pixels of the dimming screen according to the input image, and processing the first dimming picture to obtain a second dimming picture;

Step S140: providing the display picture to make the dimming screen perform backlight modulation on the display screen according to the second dimming picture, and providing the second dimming picture to make the display screen display the input image according to the display picture.

For example, in some examples, the display panel may directly use the obtained second dimming picture and the display picture for a display operation to display the input image. For example, in other examples, as shown in FIG. 6B, after the step S130 and before the step S140, the driving method may further include: adjusting the display picture according to the second dimming picture to obtain an adjusted display picture, so that the second dimming picture and the display picture may better match each other, and the display screen displays the input image according to the adjusted display picture. The adjustment is, for example, to adjust (increase or decrease) the corresponding display pixels in the display picture according to the grayscale values of the dimming pixels in the second dimming picture, so as to make the second dimming picture and the display picture better cooperate to achieve better contrast.

For example, in the step S130, processing the first dimming picture to obtain the second dimming picture, includes: determining white dimming pixels and black dimming pixels in the first dimming picture; determining a white dimming pattern, consisting of white dimming pixels and having a width less than or equal to L dimming pixels in a first direction, in the first dimming picture, where L is an predetermined value and is an integer greater than or equal to 2; performing brightness expansion processing on adjacent black dimming pixels that are adjacent to at least one side of the white dimming pattern in the first direction to adjust grayscale values of the adjacent black dimming pixels to obtain the second dimming picture.

For example, the value of L may be determined according to the corresponding relationship between the display pixels of the display screen and the dimming pixels of the dimming screen, and the line width of the white line segment that is determined to be adjusted to avoid color cast. For example, in a case where one pixel of the dimming screen corresponds to four adjacent display pixels arranged in two rows and two columns of the display screen, and the line width of the white line segment to be adjusted to avoid color cast is four display pixels, L may be equal to 3.

The adjacent black dimming pixels adjacent to the white dimming pattern include black pixels that are directly adjacent (that is, the pixel distance is 0) to the white dimming pattern, and black pixels that are within a predetermined pixel distance (for example, greater than 0 but less than or equal to 3). Furthermore, the adjacent black dimming pixels that are subjected to the brightness expansion processing may be on one side or both sides of the white dimming pattern.

For example, in an embodiment of the present disclosure, determining the white dimming pixels and the black dimming pixels in the first dimming picture, includes: obtaining a first grayscale threshold; determining a dimming pixel with a grayscale value greater than the first grayscale threshold in the first dimming picture as a white dimming pixel, and determining a dimming pixel with a grayscale value less than the first grayscale threshold in the first dimming picture as a black dimming pixel. For example, the grayscale values of the dimming pixels in the first dimming picture range from 0 to 255, and the first grayscale threshold Th1 may range from 100 to 150. For example, when Th1=100, the dimming pixels with grayscale values greater than 100 in the first dimming picture are white dimming pixels, and the dimming pixels with grayscale values less than 100 in the first dimming picture are black dimming pixels. When Th1=150, the dimming pixels with grayscale values greater than 150 in the first dimming picture are white dimming pixels, and the dimming pixels with grayscale values less than 150 in the first dimming picture are black dimming pixels.

For example, in the embodiment of the present disclosure, determining the white dimming pixels and the black dimming pixels in the first dimming picture includes: obtaining a second grayscale threshold and a third grayscale threshold, the second grayscale threshold being greater than the third grayscale threshold; determining a dimming pixel with a grayscale value greater than the second grayscale threshold in the first dimming picture as a white dimming pixel, and determining a dimming pixel with a grayscale value less than the third grayscale threshold in the first dimming picture as a black dimming pixel. For example, the grayscale values of the dimming pixels in the first dimming picture range from 0 to 255, the second grayscale threshold Th2 may range from 150 to 200, and the third grayscale threshold Th3 may range from 50 to 100. For example, when Th2=200 and Th3=50, the dimming pixel with a grayscale value greater than 200 in the first dimming picture is a white dimming pixel, the dimming pixel with a grayscale value less than 50 in the first dimming picture is a black dimming pixel, and the dimming pixel with a grayscale value greater than 50 and less than 200 in the first dimming picture is a gray dimming pixel.

It should be noted that the value ranges of the first grayscale threshold, the second grayscale threshold, and the third grayscale threshold given in the embodiment of the present disclosure are exemplary, and the value ranges of the first grayscale threshold, the second grayscale threshold, and the third grayscale threshold may be adjusted as needed, and the embodiments of the present disclosure do not limit this.

For example, in an embodiment of the present disclosure, determining the white dimming pattern, consisting of white dimming pixels and having a width less than or equal to L dimming pixels in a first direction, in the first dimming picture, comprises: for any one target black dimming pixel as a judgment target in the first dimming picture, judging whether l consecutive dimming pixels that start from the target black dimming pixel in the first direction and are directly adjacent to each other along the same direction are all white dimming pixels and whether a (l+1)-th pixel is a black dimming pixel, if yes, determining a white dimming pattern consisting of the l consecutive dimming pixels and having a width of l dimming pixels in the first direction, where $1 \leq l \leq L$ and l is an integer.

In at least one example, in order to determine the white dimming pattern which is composed of white dimming pixels and has a width less than or equal to L dimming pixels in the first direction in the first dimming picture, the first dimming picture may be traversed, and each black dimming pixel encountered in the traversal process may be used as the current judgment target, that is, the current "target black dimming pixel", to perform the above judgment, so that all white dimming patterns in the first dimming picture meeting the requirement that a width in the first direction is less than or equal to L dimming pixels may be determined.

Figure 7A:
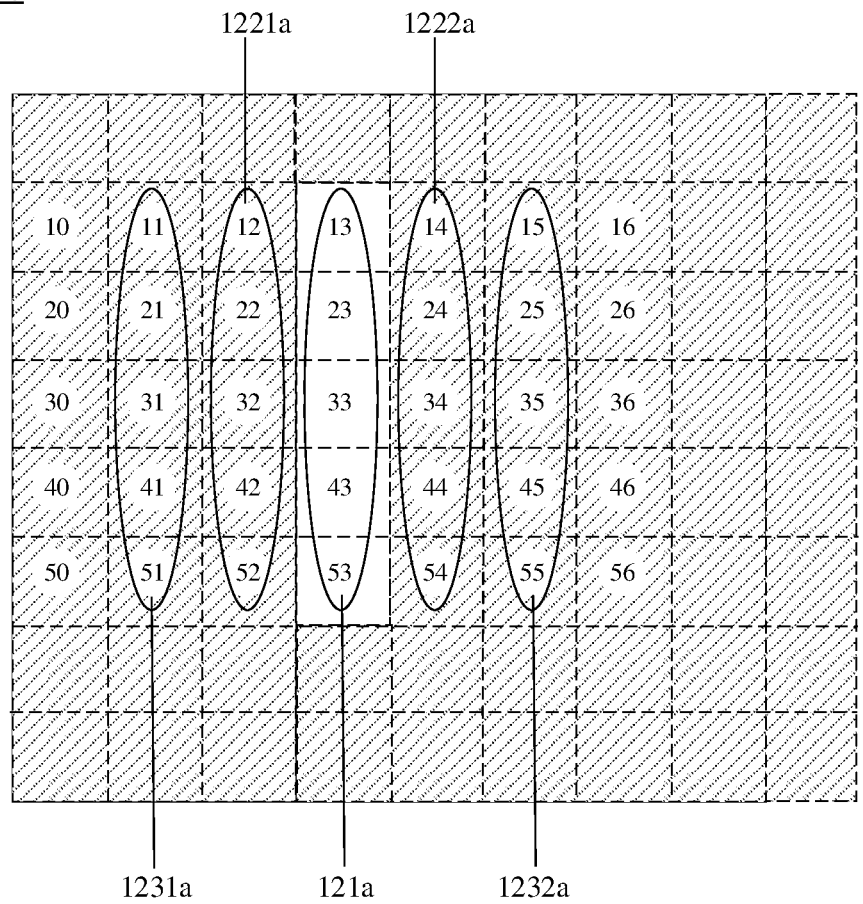
FIG. 7A is a schematic diagram of a first dimming picture of a dimming screen provided by an embodiment of the present disclosure.
Figure 7B:
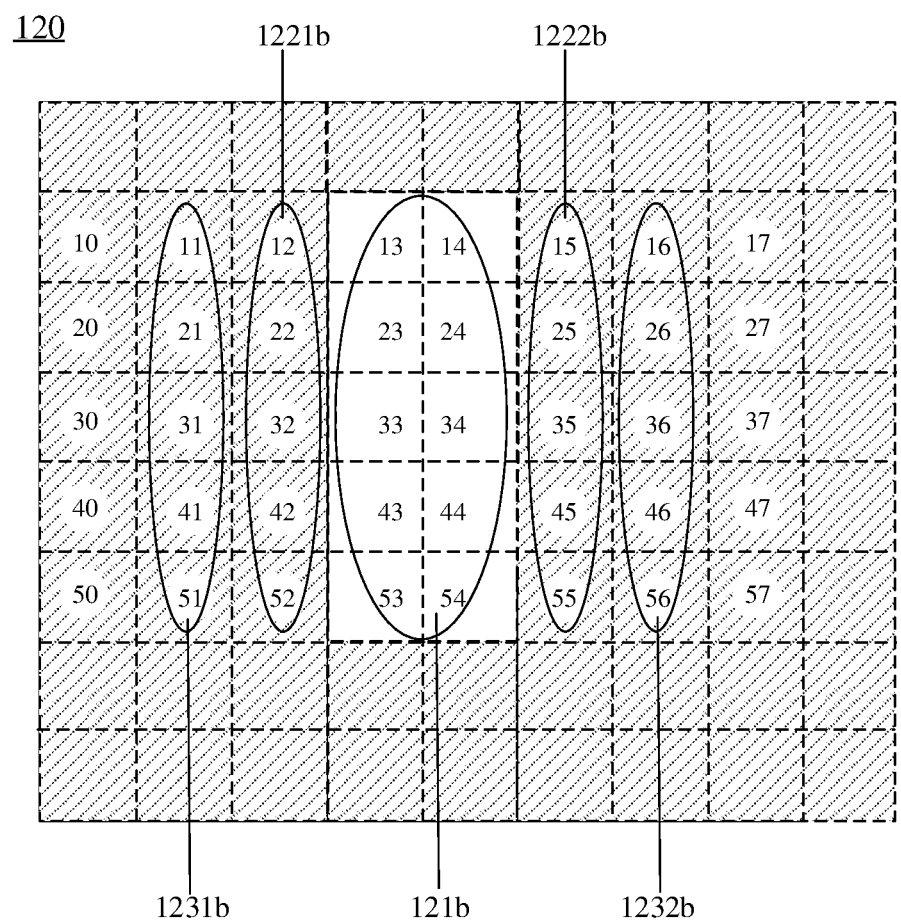
FIG. 7B is another schematic diagram of a first dimming picture of a dimming screen provided by an embodiment of the present disclosure.
Figure 7C:
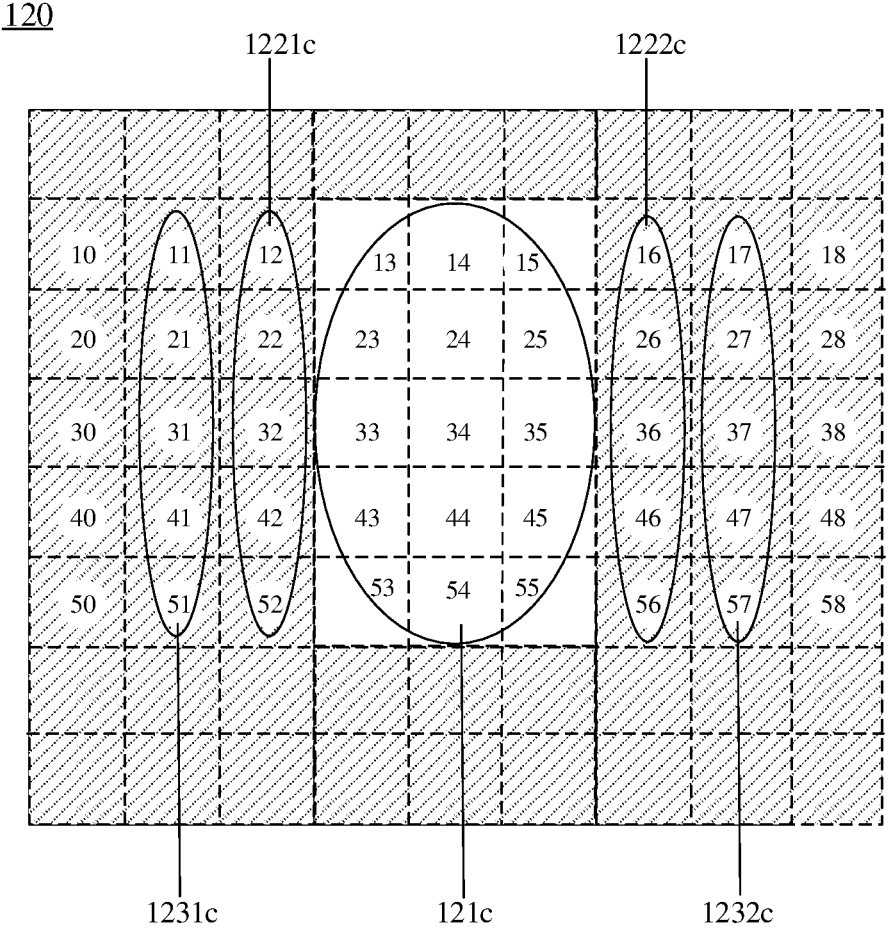
FIG. 7C is still another schematic diagram of a first dimming picture of a dimming screen provided by an embodiment of the present disclosure.

FIG. 7A is a schematic diagram of a first dimming picture of a dimming screen provided by an embodiment of the present disclosure. FIG. 7B is another schematic diagram of a first dimming picture of a dimming screen provided by an embodiment of the present disclosure. FIG. 7C is still another schematic diagram of a first dimming picture of a dimming screen provided by an embodiment of the present disclosure. In addition, although FIG. 7A-FIG. 7C take a case that the white dimming pattern is a straight line pattern as an example, the embodiments of the present disclosure are not limited to this, for example, the white dimming pattern may also be a curved pattern.

As shown in FIG. 7A, in the first dimming picture of the dimming screen 120, the dimming pixels numbered 13, 23, 33, 43, and 53 are white dimming pixels, and the rest of the dimming pixels are black dimming pixels. In this case, the white dimming pixel 13, the white dimming pixel 23, the white dimming pixel 33, the white dimming pixel 43, and the white dimming pixel 53 in the first dimming picture form a white dimming pattern 121a, and the width of the white dimming pattern 121a in the first direction (for example, the row direction of the dimming pixels) is one dimming pixel. Furthermore, as shown in FIG. 7A, in the first direction, the black dimming pixel 11, the black dimming pixel 21, the black dimming pixel 31, the black dimming pixel 41, the black dimming pixel 51, the black dimming pixel 12, the black dimming pixel 22, the black dimming pixel 32, the black dimming pixel 42, and the black dimming pixel 52 are adjacent to the first side of the white dimming pattern 121a. The black dimming pixel 14, the black dimming pixel 24, the black dimming pixel 34, the black dimming pixel 44, the black dimming pixel 54, the black dimming pixel 15, the black dimming pixel 25, the black dimming pixel 35, the black dimming pixel 45, and the black dimming pixel 55 are adjacent to the second side of the white dimming pattern 121a. The first side and the second side are two opposite sides of the white dimming pattern 121a in the first direction.

As shown in FIG. 7B, in the first dimming picture of the dimming screen 120, the dimming pixels numbered 13, 23, 33, 43, 53, 14, 24, 34, 44, and 54 are white dimming pixels, and the rest of the dimming pixels are black dimming pixels. In this case, the white dimming pixel 13, the white dimming pixel 23, the white dimming pixel 33, the white dimming pixel 43, the white dimming pixel 53, the white dimming pixel 14, the white dimming pixel 24, the white dimming pixel 34, the white dimming pixel 44, and the white dimming pixel 54 in the first dimming picture form a white dimming pattern 121b, and the width of the white dimming pattern 121b in the first direction (for example, the row direction of the dimming pixels) is 2 dimming pixels. Furthermore, as shown in FIG. 7B, in the first direction, the black dimming pixel 11, the black dimming pixel 21, the black dimming pixel 31, the black dimming pixel 41, the black dimming pixel 51, the black dimming pixel 12, the black dimming pixel 22, the black dimming pixel 32, the black dimming pixel 42, and the black dimming pixel 52 are adjacent to the first side of the white dimming pattern 121b; the black dimming pixel 15, the black dimming pixel 25, the black dimming pixel 35, the black dimming pixel 45, the black dimming pixel 55, the black dimming pixel 16, the black dimming pixel 26, the black dimming pixel 36, the black dimming pixel 46, and the black dimming pixel 56 are adjacent to the second side of the white dimming pattern 121b. The first side and the second side are two opposite sides of the white dimming pattern 121b in the first direction.

As shown in FIG. 7C, in the first dimming picture of the dimming screen 120, the dimming pixels numbered 13, 23, 33, 43, 53, 14, 24, 34, 44, 54, 15, 25, 35, 45, and 55 are white dimming pixels, and the rest of the dimming pixels are black dimming pixels. In this case, the white dimming pixel 13, the white dimming pixel 23, the white dimming pixel 33, the white dimming pixel 43, the white dimming pixel 53, the white dimming pixel 14, the white dimming pixel 24, the white dimming pixel 34, the white dimming pixel 44, the white dimming pixel 54, the white dimming pixel 15, the white dimming pixel 25, the white dimming pixel 35, the white dimming pixel 45, and the white dimming pixel 55 in the first dimming picture form a white dimming pattern 121c, and the width of the white dimming pattern 121c in the first direction (for example, the row direction of the dimming pixels) is 3 dimming pixels. Furthermore, as shown in FIG. 7C, in the first direction, the black dimming pixel 11, the black dimming pixel 21, the black dimming pixel 31, the black dimming pixel 41, the black dimming pixel 51, the black dimming pixel 12, the black dimming pixel 22, the black dimming pixel 32, the black dimming pixel 42, and the black dimming pixel 52 are adjacent to the first side of the white dimming pattern 121c. The black dimming pixel 16, the black dimming pixel 26, the black dimming pixel 36, the black dimming pixel 46, the black dimming pixel 56, the black dimming pixel 17, the black dimming pixel 27, the black dimming pixel 37, the black dimming pixel 47, and the black dimming pixel 57 are adjacent to the second side of the white dimming pattern 121c. The first side and the second side are two opposite sides of the white dimming pattern 121c in the first direction.

For example, in the embodiments of the present disclosure, the black dimming pixels adjacent to at least one side of the white dimming pattern in the first direction include a primary black dimming pixel and a secondary black dimming pixel, the primary black dimming pixel is directly adjacent to the at least one side of the white dimming pattern in the first direction, and the secondary black dimming pixel is directly adjacent to the primary black dimming pixel in the first direction and located on the side of the primary black dimming pixel away from the white dimming pattern.

As shown in FIG. 7A, the black dimming pixel 12, the black dimming pixel 22, the black dimming pixel 32, the black dimming pixel 42, and the black dimming pixel 52 are directly adjacent to the first side of the white dimming pattern 121a in the first direction, and the black dimming pixel 12, the black dimming pixel 22, the black dimming pixel 32, the black dimming pixel 42, and the black dimming pixel 52 are all primary black dimming pixels 1221a. The black dimming pixel 14, the black dimming pixel 24, the black dimming pixel 34, the black dimming pixel 44, and the black dimming pixel 54 are directly adjacent to the second side of the white dimming pattern 121a in the first direction, and the black dimming pixel 14, the black dimming pixel 24, the black dimming pixel 34, the black dimming pixel 44, and the black dimming pixel 54 are all primary black dimming pixels 1222a. The black dimming pixel 11, the black dimming pixel 21, the black dimming pixel 31, the black dimming pixel 41, and the black dimming pixel 51 are directly adjacent to the primary black dimming pixels 1221a in the first direction and located on the side of the primary black dimming pixels 1221a away from the white dimming pattern 121a, that is, the black dimming pixel 11, the black dimming pixel 21, the black dimming pixel 31, the black dimming pixel 41, and the black dimming pixel 51 are directly adjacent to the first side of the primary black dimming pixels 1221a in the first direction, and the black dimming pixel 11, the black dimming pixel 21, the black dimming pixel 31, the black dimming pixel 41, and the black dimming pixel 51 are all secondary black dimming pixels 1231a. The black dimming pixel 15, the black dimming pixel 25, the black dimming pixel 35, the black dimming pixel 45, and the black dimming pixel 55 are directly adjacent to the primary black dimming pixels 1222a in the first direction and located on the side of the primary black dimming pixels 1222a away from the white dimming pattern 121a, that is, the black dimming pixel 15, the black dimming pixel 25, the black dimming pixel 35, the black dimming pixel 45, and the black dimming pixel 55 are directly adjacent to the second side of the primary black dimming pixels 1222a in the first direction, and the black dimming pixel 15, the black dimming pixel 25, the black dimming pixel 35, the black dimming pixel 45, and the black dimming pixel 55 are all secondary black dimming pixels 1232a.

As shown in FIG. 7B, the black dimming pixel 12, the black dimming pixel 22, the black dimming pixel 32, the black dimming pixel 42, and the black dimming pixel 52 are directly adjacent to the first side of the white dimming pattern 121b in the first direction, and the black dimming pixel 12, the black dimming pixel 22, the black dimming pixel 32, the black dimming pixel 42, and the black dimming pixel 52 are all primary black dimming pixels 1221b; the black dimming pixel 15, the black dimming pixel 25, the black dimming pixel 35, the black dimming pixel 45, and the black dimming pixel 55 are directly adjacent to the second side of the white dimming pattern 121a in the first direction, and the black dimming pixel 15, the black dimming pixel 25, the black dimming pixel 35, the black dimming pixel 45, and the black dimming pixel 55 are all primary black dimming pixels 1222b; the black dimming pixel 11, the black dimming pixel 21, the black dimming pixel 31, the black dimming pixel 41, and the black dimming pixel 51 are directly adjacent to the primary black dimming pixels 1221b in the first direction and located on the side of the primary black dimming pixels 1221b away from the white dimming pattern 121b, that is, the black dimming pixel 11, the black dimming pixel 21, the black dimming pixel 31, the black dimming pixel 41, and the black dimming pixel 51 are directly adjacent to the first side of the primary black dimming pixels 1221b in the first direction, and the black dimming pixel 11, the black dimming pixel 21, the black dimming pixel 31, the black dimming pixel 41, and the black dimming pixel 51 are all secondary black dimming pixels 1231b; the black dimming pixel 16, the black dimming pixel 26, the black dimming pixel 36, the black dimming pixel 46, and the black dimming pixel 56 are directly adjacent to the primary black dimming pixels 1222b in the first direction and located on the side of the primary black dimming pixels 1222b away from the white dimming pattern 121b, that is, the black dimming pixel 16, the black dimming pixel 26, the black dimming pixel 36, the black dimming pixel 46, and the black dimming pixel 56 are directly adjacent to the second side of the primary black dimming pixels 1222b in the first direction, and the black dimming pixel 16, the black dimming pixel 26, the black dimming pixel 36, the black dimming pixel 46, and the black dimming pixel 56 are all secondary black dimming pixels 1232b.

As shown in FIG. 7C, the black dimming pixel 12, the black dimming pixel 22, the black dimming pixel 32, the black dimming pixel 42, and the black dimming pixel 52 are directly adjacent to the first side of the white dimming pattern 121c in the first direction. The black dimming pixel 12, the black dimming pixel 22, the black dimming pixel 32, the black dimming pixel 42, and the black dimming pixel 52 are all primary black dimming pixels 1221c; the black dimming pixel 16, the black dimming pixel 26, the black dimming pixel 36, the black dimming pixel 46, and the black dimming pixel 56 are directly adjacent to the second side of the white dimming pattern 121c in the first direction, and the black dimming pixel 16, the black dimming pixel 26, the black dimming pixel 36, the black dimming pixel 46, and the black dimming pixel 56 are all primary black dimming pixels 1222c. The black dimming pixel 11, the black dimming pixel 21, the black dimming pixel 31, the black dimming pixel 41, and the black dimming pixel 51 are directly adjacent to the primary black dimming pixels 1221c in the first direction and located on the side of the primary black dimming pixels 1221c away from the white dimming pattern 121c, that is, the black dimming pixel 11, the black dimming pixel 21, the black dimming pixel 31, the black dimming pixel 41, and the black dimming pixel 51 are directly adjacent to the first side of the primary black dimming pixels 1221c in the first direction, and the black dimming pixel 11, the black dimming pixel 21, the black dimming pixel 31, the black dimming pixel 41, and the black dimming pixel 51 are all secondary black dimming pixels 1231c. The black dimming pixel 17, the black dimming pixel 27, the black dimming pixel 37, the black dimming pixel 47, and the black dimming pixel 57 are directly adjacent to the primary black dimming pixels 1222c in the first direction and located on the side of the primary black dimming pixels 1222c away from the white dimming pattern 121c, that is, the black dimming pixel 17, the black dimming pixel 27, the black dimming pixel 37, the black dimming pixel 47, and the black dimming pixel 57 are directly adjacent to the second side of the primary black dimming pixels 1222c in the first direction, and the black dimming pixel 17, the black dimming pixel 27, the black dimming pixel 37, the black dimming pixel 47, and the black dimming pixel 57 are all secondary black dimming pixels 1232c.

For example, in an embodiment of the present disclosure, a plurality of dimming pixels directly adjacent to the primary black dimming pixels may include dimming pixels directly adjacent to the primary black dimming pixels in the row direction of the dimming pixels, dimming pixels directly adjacent to the primary black dimming pixels in the column direction of the dimming pixels, and dimming pixels directly adjacent to the primary black dimming pixels in the diagonal direction of the dimming pixels.

As shown in FIG. 7A, the first dimming picture of the dimming screen 120 includes the primary black dimming pixels 1221a and the primary black dimming pixels 1222a. Taking the black dimming pixel 22 in the primary black dimming pixels 1221a as an example, the number of dimming pixels directly adjacent to the black dimming pixel 22 in the primary black dimming pixels 1221a is eight, for example, the black dimming pixel 11, the black dimming pixel 21, and the black dimming pixel 31 in the secondary black dimming pixels 1231a, the black dimming pixel 12 and the black dimming pixel 32 in the primary black dimming pixels 1221a, and the white dimming pixel 13, the white dimming pixel 23, and the white dimming pixel 33 in the white dimming pattern 121a are eight dimming pixels directly adjacent to the black dimming pixel 22 in the primary black dimming pixels 1221a.

Taking the black dimming pixel 24 in the primary black dimming pixels 1222a as an example, the number of dimming pixels directly adjacent to the black dimming pixel 24 in the primary black dimming pixels 1222a is eight, for example, the black dimming pixel 15, the black dimming pixel 25, and the black dimming pixel 35 in the secondary black dimming pixels 1232a, the black dimming pixel 14 and the black dimming pixel 34 in the primary black dimming pixels 1222a, and the white dimming pixel 13, the white dimming pixel 23, and the white dimming pixel 33 in the white dimming pattern 121a are eight dimming pixels directly adjacent to black dimming pixel 24 in the primary black dimming pixels 1222a.

As shown in FIG. 7B, the first dimming picture of the dimming screen 120 includes the primary black dimming pixels 1221b and the primary black dimming pixels 1222b. Taking the black dimming pixel 22 in the primary black dimming pixels 1221b as an example, the number of dimming pixels directly adjacent to the black dimming pixel 22 in the primary black dimming pixels 1221b is eight, for example, the black dimming pixel 11, the black dimming pixel 21, and the black dimming pixel 31 in the secondary black dimming pixels 1231b, the black dimming pixel 12 and the black dimming pixel 32 in the primary black dimming pixels 1221b, and the white dimming pixel 13, the white dimming pixel 23, and the white dimming pixel 33 in the white dimming pattern 121b are eight dimming pixels directly adjacent to the black dimming pixel 22 in the primary black dimming pixels 1221b.

Taking the black dimming pixel 25 in the primary black dimming pixels 1222b as an example, the number of dimming pixels directly adjacent to the black dimming pixel 25 in the primary black dimming pixels 1222b is eight, for example, the black dimming pixel 16, the black dimming pixel 26, and the black dimming pixel 36 in the secondary black dimming pixels 1232b, the black dimming pixel 15 and the black dimming pixel 35 in the primary black dimming pixels 1222b, and the white dimming pixel 14, the white dimming pixel 24, and the white dimming pixel 34 in the white dimming pattern 121b are eight dimming pixels directly adjacent to the black dimming pixel 25 in the primary black dimming pixels 1222b.

As shown in FIG. 7C, the first dimming picture of the dimming screen 120 includes the primary black dimming pixels 1221c and the primary black dimming pixels 1222c. Taking the black dimming pixel 22 in the primary black dimming pixels 1221c as an example, the number of dimming pixels directly adjacent to the black dimming pixel 22 in the primary black dimming pixels 1221c is eight, for example, the black dimming pixel 11, the black dimming pixel 21, and the black dimming pixel 31 in the secondary black dimming pixels 1231c, the black dimming pixel 12 and the black dimming pixel 32 in the primary black dimming pixels 1221c, and the white dimming pixel 13, the white dimming pixel 23, and the white dimming pixel 33 in the white dimming pattern 121c are eight dimming pixels directly adjacent to the black dimming pixel 22 in the primary black dimming pixels 1221c.

Taking the black dimming pixel 26 in the primary black dimming pixels 1222c as an example, the number of dimming pixels directly adjacent to the black dimming pixel 26 in the primary black dimming pixels 1222c is eight, for example, the black dimming pixel 17, the black dimming pixel 27, and the black dimming pixel 37 in the secondary black dimming pixels 1232c, the black dimming pixel 16 and the black dimming pixel 36 in the primary black dimming pixels 1222c, and the white dimming pixel 15, the white dimming pixel 25, and the white dimming pixel 35 in the white dimming pattern 121c are eight dimming pixels directly adjacent to the black dimming pixel 26 in the primary black dimming pixels 1222c.

For example, in the embodiment of the present disclosure, performing brightness expansion processing on the adjacent black dimming pixels that are adjacent to at least one side of the white dimming pattern in the first direction to adjust the grayscale values of the adjacent black dimming pixels, comprises: obtaining a primary grayscale value of the primary black dimming pixel and a plurality of grayscale values of a plurality of dimming pixels directly adjacent to the primary black dimming pixel as a plurality of reference primary grayscale values of the primary black dimming pixel; obtaining a primary expansion coefficient corresponding to the primary black dimming pixel; based on the primary grayscale value, the plurality of reference primary grayscale values, and the primary expansion coefficient, obtaining a primary adjusted grayscale value for the primary black dimming pixel; assigning the primary adjusted grayscale value to the primary black dimming pixel.

For example, in the embodiment of the present disclosure, obtaining the primary expansion coefficient corresponding to the primary black dimming pixel, comprises: for a white dimming pattern with a width equal to one dimming pixel in the first direction, obtaining a first coefficient as the primary expansion coefficient corresponding to the primary black dimming pixel; for a white dimming pattern with a width equal to 2 dimming pixels in the first direction, obtaining a second coefficient as the primary expansion coefficient corresponding to the primary black dimming pixel; for a white dimming pattern with a width equal to 3 dimming pixels in the first direction, obtaining a third coefficient as the primary expansion coefficient corresponding to the primary black dimming pixel.

Referring to FIG. 7A, when the width of the white dimming pattern 121a in the first dimming picture of the dimming screen 120 in the first direction is one dimming pixel, the primary expansion coefficient corresponding to the primary black dimming pixels 1221a and the primary black dimming pixels 1222a is a first coefficient $K_1$, for example, the value of the first coefficient $K_1$ is 0.8.

Referring to FIG. 7B, when the width of the white dimming pattern 121b in the first dimming picture of the dimming screen 120 in the first direction is two dimming pixels, the primary expansion coefficient corresponding to the primary black dimming pixels 1221b and the primary black dimming pixels 1222b is a second coefficient $K_2$, for example, the value of the second coefficient $K_2$ is 0.8.

Referring to FIG. 7C, when the width of the white dimming pattern 121c in the first dimming picture of the dimming screen 120 in the first direction is three dimming pixels, the primary expansion coefficient corresponding to the primary black dimming pixels 1221c and the primary black dimming pixels 1222c is a third coefficient $K_3$, for example, the value of the third coefficient $K_3$ is 0.9.

For example, in the embodiment of the present disclosure, based on the primary grayscale value, the plurality of reference primary grayscale values, and the primary expansion coefficient, obtaining the primary adjusted grayscale value for the primary black dimming pixel, comprises: selecting a maximum primary grayscale value among the primary grayscale value and the reference primary grayscale values, and obtaining the primary adjusted grayscale value for the primary black dimming pixel based on the maximum primary grayscale value and the primary expansion coefficient.

For example, in the embodiment of the present disclosure, the calculation formula for obtaining the primary adjusted grayscale value for the primary black dimming pixel based on the maximum primary grayscale value and the primary expansion coefficient is as follows:

$$V_p = \text{floor}(K_p * M_p)$$

where $V_p$ represents the primary adjusted grayscale value, $K_p$ represents the primary expansion coefficient, and $M_p$ represents the maximum primary grayscale value.

Next, with reference to FIG. 7A, FIG. 7B, and FIG. 7C, the method to obtain the primary adjusted grayscale value of the primary black dimming pixel will be described in detail.

Referring to FIG. 7A, the black dimming pixel 24 of the primary black dimming pixels 1222a is taken as an example to describe. First, acquiring the primary grayscale value of the black dimming pixel 24, and acquiring eight grayscale values of eight dimming pixels (namely, the black dimming pixel 15, the black dimming pixel 25, the black dimming pixel 35, the black dimming pixel 14, the black dimming pixel 34, the white dimming pixel 13, the white dimming pixel 23 and the white dimming pixel 33) directly adjacent to the black dimming pixel 24 as eight reference primary grayscale values for the black dimming pixel 24. Then, selecting the maximum primary grayscale value $M_p$ among the primary grayscale value of the black dimming pixel 24 and the eight reference primary grayscale values for the black dimming pixel 24. And then, because the width of the white dimming pattern 121a in the first dimming picture of the dimming screen 120 shown in FIG. 7A in the first direction is one dimming pixel, the first coefficient K1 is obtained as the primary expansion coefficient $K_p$ corresponding to the black dimming pixel 24. Finally, based on the maximum primary grayscale value $M_p$ and the primary expansion coefficient $K_p$, the primary adjusted grayscale value $V_P$ for the black dimming pixel 24 is obtained according to the calculation formula $V_p = \text{floor}(K_p * M_p)$. Finally, the calculated primary adjusted grayscale value $V_p$ is assigned to the black dimming pixel 24.

Referring to FIG. 7B, the black dimming pixel 25 in the primary black dimming pixels 1222b is taken as an example to describe. First, acquiring the primary grayscale value of the black dimming pixel 25, and acquiring eight grayscale values of eight dimming pixels (namely, the black dimming pixel 16, the black dimming pixel 26, the black dimming pixel 36, the black dimming pixel 15, the black dimming pixel 35, the white dimming pixel 14, the white dimming pixel 24, and the white dimming pixel 34) directly adjacent to the black dimming pixel 25 as eight reference primary grayscale values for the black dimming pixel 25. Then, selecting the maximum primary grayscale value $M_p$ among the primary grayscale value of the black dimming pixel 25 and the eight reference primary grayscale values for the black dimming pixel 25. And then, because the width of the white dimming pattern 121b in the first dimming picture of the dimming screen 120 shown in FIG. 7B in the first direction is 2 dimming pixels, the second coefficient K2 is obtained as the primary expansion coefficient $K_p$ corresponding to the black dimming pixel 25. Finally, based on the maximum primary grayscale value $M_p$ and the primary expansion coefficient $K_p$, the primary adjusted grayscale value $V_P$ for the black dimming pixel 25 is obtained according to the calculation formula $V_p = \text{floor}(K_p * M_p)$. Finally, the calculated primary adjusted grayscale value $V_p$ is assigned to the black dimming pixel 25.

Referring to FIG. 7C, the black dimming pixel 26 in the primary black dimming pixels 1222c is taken as an example to describe. Acquiring the primary grayscale value of the black dimming pixel 26, and acquiring eight grayscale values of eight dimming pixels (namely, the black dimming pixel 17, the black dimming pixel 27, the black dimming pixel 37, the black dimming pixel 16, the black dimming pixel 36, the white dimming pixel 15, the white dimming pixel 25, and the white dimming pixel 35) directly adjacent to the black dimming pixel 26 as eight reference primary grayscale values for the black dimming pixel 26. Then, selecting the maximum primary grayscale value $M_p$ among the primary grayscale value of the black dimming pixel 26 and the eight reference primary grayscale values for the black dimming pixel 26. And then, because the width of the white dimming pattern 121c in the first dimming picture of the dimming screen 120 shown in FIG. 7C in the first direction is 3 dimming pixels, the third coefficient K3 is obtained as the primary expansion coefficient $K_p$ corresponding to the black dimming pixel 26. Finally, based on the maximum primary grayscale value $M_p$ and the primary expansion coefficient $K_p$, the primary adjusted grayscale value $V_P$ for the black dimming pixel 26 is obtained according to the calculation formula $V_p = \text{floor}(K_p * M_p)$. Finally, the calculated primary adjusted grayscale value $V_p$ is assigned to the black dimming pixel 26.

For example, in the embodiment of the present disclosure, a plurality of dimming pixels directly adjacent to the secondary black dimming pixels may include dimming pixels directly adjacent to the secondary black dimming pixels in the row direction of the dimming pixels, dimming pixels directly adjacent to the secondary black dimming pixels in the column direction of the dimming pixels, and dimming pixels directly adjacent to the secondary black dimming pixels in the diagonal direction of the dimming pixels.

As shown in FIG. 7A, the first dimming picture of the dimming screen 120 includes the secondary black dimming pixels 1231a and the secondary black dimming pixels 1232a. Taking the black dimming pixel 21 in the secondary black dimming pixels 1231a as an example, the black dimming pixel 10, the black dimming pixel 20, the black dimming pixel 30, the black dimming pixel 11 and the black dimming pixel 31 in the secondary black dimming pixels 1231a, and the black dimming pixel 12, the black dimming pixel 22, and the black dimming pixel 32 in the primary black dimming pixels 1221a are the plurality of dimming pixels directly adjacent to the black dimming pixel 21 in the secondary black dimming pixels 1231a.

Taking the black dimming pixel 25 in the secondary black dimming pixels 1232a as an example, the black dimming pixel 16, the black dimming pixel 26, the black dimming pixel 36, the black dimming pixel 15 and the black dimming pixel 35 in the secondary black dimming pixels 1232a, and the black dimming pixel 14, the black dimming pixel 24, and the black dimming pixel 34 in the primary black dimming pixels 1222a are the plurality of dimming pixels directly adjacent to the black dimming pixel 25 in the secondary black dimming pixels 1232a.

As shown in FIG. 7B, the first dimming picture of the dimming screen 120 includes the secondary black dimming pixels 1231b and the secondary black dimming pixels 1232b. Taking the black dimming pixel 21 in the secondary black dimming pixels 1231b as an example, the black dimming pixel 10, the black dimming pixel 20, the black dimming pixel 30, the black dimming pixel 11 and the black dimming pixel 31 in the secondary black dimming pixels 1231b, and the black dimming pixel 12, the black dimming pixel 22, and the black dimming pixel 32 in the primary black dimming pixels 1221b are the plurality of dimming pixels directly adjacent to the black dimming pixel 21 in the secondary black dimming pixels 1231*b*.

Taking the black dimming pixel 26 in the secondary black dimming pixel 1232*b* as an example, the black dimming pixel 17, the black dimming pixel 27, the black dimming pixel 37, the black dimming pixel 16 and the black dimming pixel 36 in the secondary black dimming pixels 1232*b*, and the black dimming pixel 15, the black dimming pixel 25, and the black dimming pixel 35 in the primary black dimming pixels 1222*b* are the plurality of dimming pixels directly adjacent to the black dimming pixel 26 in the secondary black dimming pixels 1232*b*.

As shown in FIG. 7C, the first dimming picture of the dimming screen 120 includes the secondary black dimming pixels 1231*c* and the secondary black dimming pixels 1232*c*. Taking the black dimming pixel 21 in the secondary black dimming pixels 1231*c* as an example, the black dimming pixel 10, the black dimming pixel 20, the black dimming pixel 30, the black dimming pixel 11 and the black dimming pixel 31 in the secondary black dimming pixels 1231*c*, and the black dimming pixel 12, the black dimming pixel 22, and the black dimming pixel 32 in the primary black dimming pixels 1221*c* are the plurality of dimming pixels directly adjacent to the black dimming pixel 21 in the secondary black dimming pixels 1231*c*.

Taking the black dimming pixel 27 in the secondary black dimming pixels 1232*c* as an example, the black dimming pixel 18, the black dimming pixel 28, the black dimming pixel 38, the black dimming pixel 17 and the black dimming pixel 37 in the secondary black dimming pixels 1232*c*, and the black dimming pixel 16, the black dimming pixel 26, and the black dimming pixel 36 in the primary black dimming pixels 1222*c* are the plurality of dimming pixels directly adjacent to the black dimming pixel 27 in the secondary black dimming pixels 1232*c*.

For example, in the embodiment of the present disclosure, performing brightness expansion processing on the adjacent black dimming pixels that are adjacent to at least one side of the white dimming pattern in the first direction to adjust the grayscale values of the adjacent black dimming pixels, further comprises: obtaining a secondary grayscale value of the secondary black dimming pixel and a plurality of grayscale values of a plurality of dimming pixels directly adjacent to the secondary black dimming pixel as a plurality of secondary reference grayscale values; obtaining a secondary expansion coefficient corresponding to the secondary black dimming pixel; obtaining a secondary adjusted grayscale value for the secondary black dimming pixel, based on the secondary grayscale value, the plurality of secondary reference grayscale values, and the secondary expansion coefficient; assigning the secondary adjusted grayscale value to the secondary black dimming pixel.

For example, in the embodiment of the present disclosure, obtaining the secondary expansion coefficient corresponding to the secondary black dimming pixel includes: for a white dimming pattern with a width equal to one dimming pixel in the first direction, obtaining a fourth coefficient as the secondary expansion coefficient corresponding to the secondary black dimming pixel; for a white dimming pattern with a width equal to 2 dimming pixels in the first direction, obtaining a fifth coefficient as the secondary expansion coefficient corresponding to the secondary black dimming pixel; for a white dimming pattern with a width equal to 3 dimming pixels in the first direction, obtaining a sixth coefficient as the secondary expansion coefficient corresponding to the secondary black dimming pixel.

Referring to FIG. 7A, when the width of the white dimming pattern 121*a* in the first dimming picture of the dimming screen 120 in the first direction is one dimming pixel, the secondary expansion coefficient corresponding to the secondary black dimming pixels 1231*a* and the secondary black dimming pixels 1232*a* is a fourth coefficient $K_4$, for example, the value of the fourth coefficient $K_4$ is 0.6.

Referring to FIG. 7B, when the width of the white dimming pattern 121*b* in the first dimming picture of the dimming screen 120 in the first direction is two dimming pixels, the secondary expansion coefficient corresponding to the secondary black dimming pixels 1231*b* and the secondary black dimming pixels 1232*b* is a fifth coefficient $K_5$, for example, the value of the fifth coefficient $K_5$ is 0.6.

Referring to FIG. 7C, when the width of the white dimming pattern 121*c* in the first dimming picture of the dimming screen 120 in the first direction is 3 dimming pixels, the secondary expansion coefficient corresponding to the secondary black dimming pixels 1231*c* and the secondary black dimming pixels 1232*c* is a sixth coefficient $K_6$, for example, the value of the sixth coefficient $K_6$ is 0.6.

For example, in the embodiment of the present disclosure, obtaining the secondary adjusted grayscale value for the secondary black dimming pixel, based on the secondary grayscale value, the plurality of secondary reference grayscale values, and the secondary expansion coefficient, comprises: selecting a maximum secondary grayscale value among the secondary grayscale value and the plurality of secondary reference grayscale values, and obtaining the secondary adjusted grayscale value for the secondary black dimming pixel based on the maximum secondary grayscale value and the secondary expansion coefficient.

For example, in the embodiment of the present disclosure, the calculation formula for obtaining the secondary adjusted grayscale value for the secondary black dimming pixel based on the maximum secondary grayscale value and the secondary expansion coefficient is as follows:

$$V_s = \text{floor}(K_s * M_s)$$

where $V_s$ represents the secondary adjusted grayscale value, $K_s$ represents the secondary expansion coefficient, and $M_s$ represents the maximum secondary grayscale value.

Next, with reference to FIG. 7A, FIG. 7B, and FIG. 7C, the method to obtain the secondary adjusted grayscale value of the secondary black dimming pixel will be described in detail.

Referring to FIG. 7A, the black dimming pixel 25 of the secondary black dimming pixels 1232*a* is taken as an example to describe. First, acquiring the secondary grayscale value of the black dimming pixel 25, and acquiring eight grayscale values of eight dimming pixels (namely, the black dimming pixel 16, the black dimming pixel 26, the black dimming pixel 36, the black dimming pixel 15, the black dimming pixel 35, the black dimming pixel 14, the black dimming pixel 24 and the black dimming pixel 34) directly adjacent to the black dimming pixel 25 as eight secondary reference grayscale values for the black dimming pixel 25. Then, selecting the maximum secondary grayscale value $M_s$ among the secondary grayscale value of the black dimming pixel 25 and the eight secondary reference grayscale values for the black dimming pixel 25. And then, because the width of the white dimming pattern 121*a* in the first dimming picture of the dimming screen 120 shown in FIG. 7A in the first direction is 1 dimming pixel, the fourth coefficient K4 is obtained as the secondary expansion coefficient $K_s$ corresponding to the black dimming pixel 25. Finally, based on the maximum secondary grayscale value $M_s$ and the secondary expansion coefficient $K_s$, the secondary adjusted grayscale value $V_s$ for the black dimming pixel 25 is obtained according to the calculation formula $V_s$=floor $(K_s*M_s)$. Finally, the calculated secondary adjusted grayscale value $V_s$ is assigned to the black dimming pixel 25.

Referring to FIG. 7B, the black dimming pixel 26 in the secondary black dimming pixels 1232b is taken as an example to describe. First, acquiring the secondary grayscale value of the black dimming pixel 26, and acquiring eight grayscale values of eight dimming pixels (namely, the black dimming pixel 17, the black dimming pixel 27, the black dimming pixel 37, the black dimming pixel 16, the black dimming pixel 36, the black dimming pixel 15, the black dimming pixel 25, and the black dimming pixel 35) directly adjacent to the black dimming pixel 26 as eight secondary reference grayscale values for the black dimming pixel 26. Then, selecting the maximum secondary grayscale value $M_s$ among the secondary grayscale value of the black dimming pixel 26 and the eight secondary reference grayscale values for the black dimming pixel 26. And then, because the width of the white dimming pattern 121b in the first dimming picture of the dimming screen 120 shown in FIG. 7B in the first direction is 2 dimming pixels, the fifth coefficient K5 is obtained as the secondary expansion coefficient $K_s$ corresponding to the black dimming pixel 26. Finally, based on the maximum secondary grayscale value $M_s$ and the secondary expansion coefficient $K_s$, the secondary adjusted grayscale value $V_s$ for the black dimming pixel 26 is obtained according to the calculation formula $V_s$=floor $(K_s*M_s)$. Finally, the calculated secondary adjusted grayscale value $V_s$ is assigned to the black dimming pixel 26.

Referring to FIG. 7C, the black dimming pixel 27 in the secondary black dimming pixels 1232c will be described as an example. First, acquiring the secondary grayscale value of the black dimming pixel 27, and acquiring eight grayscale values of eight dimming pixels (namely, the black dimming pixel 18, the black dimming pixel 28, the black dimming pixel 38, the black dimming pixel 17, the black dimming pixel 37, the black dimming pixel 16, the black dimming pixel 26, and the black dimming pixel 36) directly adjacent to the black dimming pixel 27 as eight secondary reference grayscale values for the black dimming pixel 27. Then, selecting the maximum secondary grayscale value $M_s$ among the secondary grayscale value of the black dimming pixel 27 and the eight secondary reference grayscale values for the black dimming pixel 27. And then, because the width of the white dimming pattern 121c in the first dimming picture of the dimming screen 120 shown in FIG. 7C in the first direction is 3 dimming pixels, the sixth coefficient K6 is obtained as the secondary expansion coefficient $K_s$ corresponding to the black dimming pixel 27. Finally, based on the maximum secondary grayscale value $M_s$ and the secondary expansion coefficient $K_s$, the secondary adjusted grayscale value $V_s$ for the black dimming pixel 27 is obtained according to the calculation formula $V_s$=floor $(K_s*M_s)$. Finally, the calculated secondary adjusted grayscale value $V_s$ is assigned to the black dimming pixel 27.

After the above processing is performed, the second dimming picture is obtained from the first dimming picture after performing brightness expansion processing, and the second dimming picture is used to perform backlight modulation on the display screen, so that the problem of color cast phenomenon when the narrow line is included in the display picture displayed by the display screen according to the input image can be avoided or reduced.

At least one embodiment of the present disclosure also provides a driving device, which is suitable for driving a display panel including a dimming screen and a display screen provided by an embodiment of the present disclosure, for example, the display panel 10 shown in FIG. 1.

Figure 8:
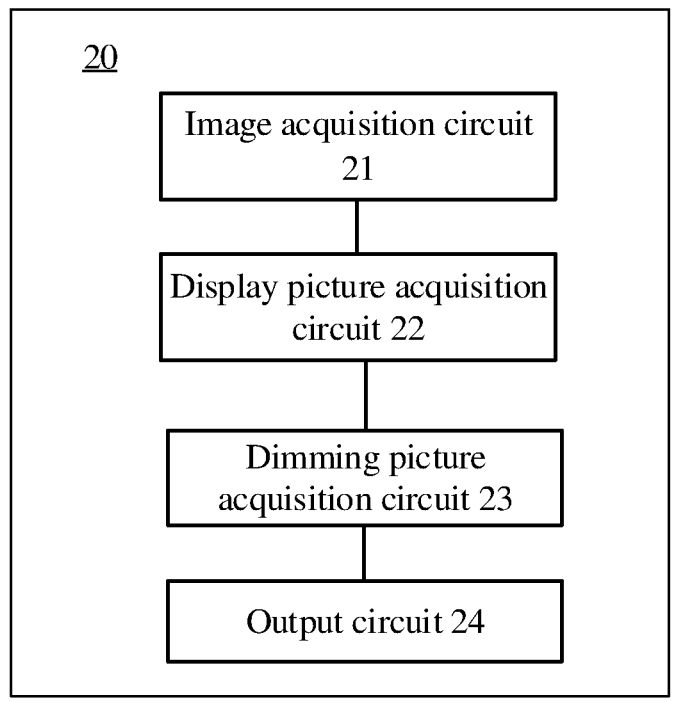
FIG. 8 is a schematic structural diagram of a driving device provided by an embodiment of the present disclosure.

FIG. 8 is a schematic structural diagram of a driving device provided by an embodiment of the present disclosure.

As shown in FIG. 8, the driving device 20 includes an image acquisition module, a display picture acquisition module, a dimming picture acquisition module, and an output module, which are used to respectively achieve the above steps S110-S140 as shown in FIG. 6A. For example, these modules may be implemented by hardware, software, firmware, or any combination thereof. For example, in at least one example, the image acquisition module, the display picture acquisition module, the dimming picture acquisition module, and the output module may be implemented by hardware, for example, are implemented as an image acquisition circuit 21, a display picture acquisition circuit 22, a dimming picture acquisition circuit 23, and an output circuit 24, respectively. The image acquisition circuit 21 is configured to acquire an input image that needs to be displayed. The display picture acquisition circuit 22 is configured to determine a display picture corresponding to the display pixels of the display screen according to the input image. The dimming picture acquisition circuit 23 is configured to determine a first dimming picture corresponding to the dimming pixels of the dimming screen according to the input image, and process the first dimming picture to obtain the second dimming picture. The output circuit 24 is configured to provide the display picture to make the dimming screen perform backlight modulation on the display screen according to the second dimming picture, and provide the second dimming picture to make the display screen display the input image according to the display picture.

For example, in the embodiment of the present disclosure, the dimming picture acquisition circuit 23 being configured to process the first dimming picture to obtain the second dimming picture, comprises: determining white dimming pixels and black dimming pixels in the first dimming picture; determining a white dimming pattern, consisting of the white dimming pixels and having a width less than or equal to L dimming pixels in a first direction, in the first dimming picture, where L is an integer greater than or equal to 2; performing brightness expansion processing on adjacent black dimming pixels that are adjacent to at least one side of the white dimming pattern in the first direction to adjust grayscale values of the adjacent black dimming pixels to obtain the second dimming picture.

At least one embodiment of the present disclosure also provides a driving device, and the driving device comprises a processor and a memory storing computer-executable instructions. When the computer-executable instructions are executed by the processor, the processor is caused to execute the driving method of the display panel provided by any of the above embodiments of the present disclosure.

Figure 9:
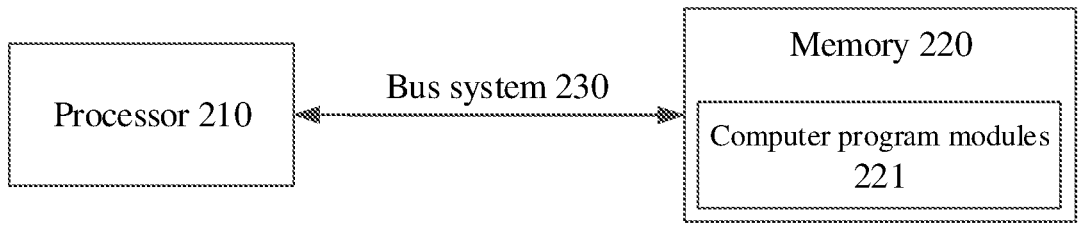
FIG. 9 is a schematic structural diagram of another driving device provided by an embodiment of the present disclosure.

FIG. 9 is a schematic structural diagram of another driving device provided by an embodiment of the present disclosure.

As shown in FIG. 9, the driving device 20 includes a processor 210, a memory 220, and a bus system 230.

For example, the processor 210 and the memory 220 are connected through the bus system 230. For example, one or more computer program modules 221 may be stored in the memory 220. For example, one or more computer program modules 221 may include instructions for executing the driving method of the display panel provided by any embodiment of the present disclosure. For example, the instructions in the one or more computer program modules

221 may be executed by the processor 210 to perform one or more steps in the driving method of the display panel according to the foregoing embodiments of the present disclosure. For example, the bus system 230 may be a common serial and parallel communication bus, which is not limited by the embodiments of the present disclosure.

In various embodiments of the present disclosure, the processor may be implemented by an application-specific integrated circuit chip, for example, the application-specific integrated circuit chip may be arranged on a motherboard, for example, a memory and a power supply circuit may also be arranged on the motherboard. The processor may also be implemented by a circuit or by software, hardware (circuit), firmware, or any combination thereof. In an embodiment of the present disclosure, the processor may include various computing structures, such as a complex instruction set computer (CISC) structure, a reduced instruction set computer (RISC) structure, or a structure that implements a combination of a plurality of instruction set. In some embodiments, the processor may also be a microprocessor, such as an X86 processor or an ARM processor, or a digital processor (DSP), etc.

In the embodiment of the present disclosure, the memory may be provided on the above-mentioned motherboard, for example, and the memory may store instructions and/or data executed by the processor. For example, the memory may include one or more computer program products, the computer program product may include various forms of computer-readable memory, such as a volatile memory and/or a nonvolatile memory. The volatile memory may include, for example, a random access memory (RAM) and/or a cache, and the like. The nonvolatile memory may include, for example, a read-only memory (ROM), a hard disk, a flash memory, etc. One or more computer program instructions may be stored on the computer-readable memory, and the processor may run the program instructions to implement the desired functions (implemented by the processor) in the embodiments of the present disclosure.

At least one embodiment of the present disclosure also provides a display device. The display device includes the display panel including a display screen and a dimming screen provided by any of the foregoing embodiments of the present disclosure and the driving device provided by any of the foregoing embodiments of the present disclosure (for example, the driving device 20 shown in FIG. 8 or FIG. 9).

Figure 10:
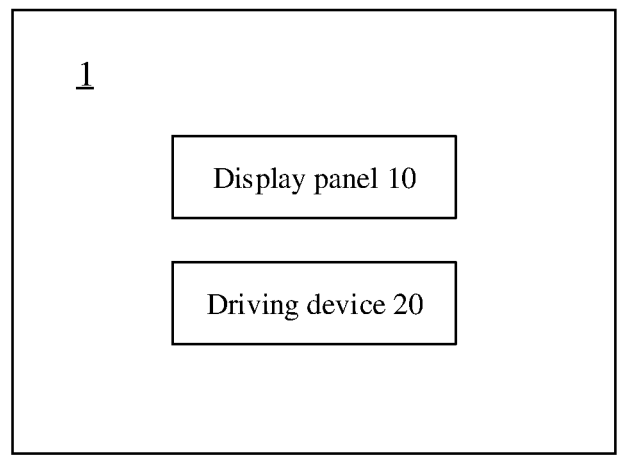
FIG. 10 is a schematic structural diagram of a display device provided by an embodiment of the present disclosure.

FIG. 10 is a schematic structural diagram of a display device provided by an embodiment of the present disclosure. As shown in FIG. 10, the display device 1 includes a display panel 10 and a driving device 20. For example, the display panel 10 in FIG. 10 may be the display panel 10 shown in FIG. 1, and the driving device 20 in FIG. 10 may be the driving device 20 shown in FIG. 8 or FIG. 9. The driving device 20 may drive the display panel 10 to display an image by adopting the driving method of the display panel provided in any of the foregoing embodiments of the present disclosure.

At least one embodiment of the present disclosure also provides a computer-readable storage medium on which computer-executable instructions are stored, and when the computer-executable instructions are executed by a computer, the computer may be caused to execute the driving method of the display panel provided by any of the foregoing embodiments of the present disclosure.

Figure 11:
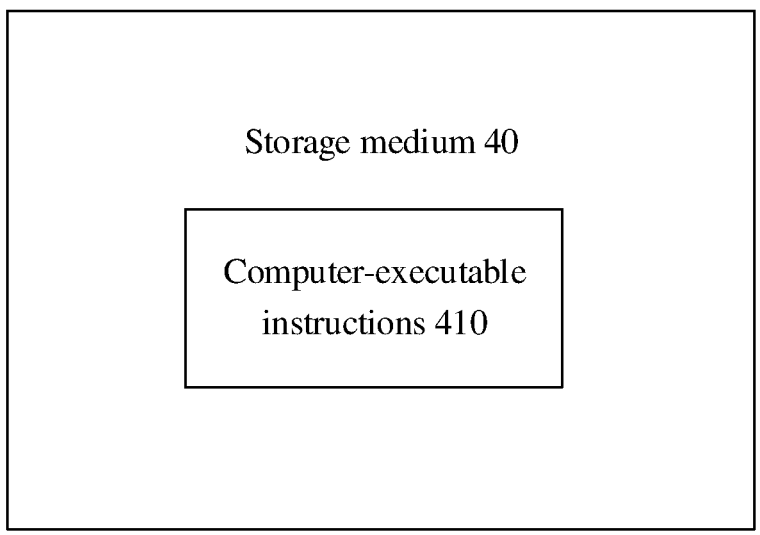
FIG. 11 is a schematic structural diagram of a computer-readable storage medium provided by an embodiment of the present disclosure.

FIG. 11 is a schematic structural diagram of a computer-readable storage medium provided by an embodiment of the present disclosure. As shown in FIG. 11, the computer-readable storage medium 40 stores computer-executable instructions 410. When the computer-executable instructions 410 are executed by a computer, the computer is caused to execute the driving method of the display panel provided by any of the foregoing embodiments of the present disclosure.

The computer-readable storage medium in the embodiment of the present disclosure can be any combination of one or more computer-readable storage media, for example, one computer-readable storage medium contains the computer-readable program codes for obtaining an input image that needs to be displayed, and the other computer-readable storage medium contains computer-readable program codes for determining a display picture corresponding to the plurality of display pixels of the display screen according to the input image. Yet another computer-readable storage medium contains the computer-readable program codes for determining a first dimming picture corresponding to the plurality of dimming pixels of the dimming screen according to the input image and processing the first dimming picture to obtain a second dimming picture, while another computer-readable storage medium contains the computer-readable program codes for providing the display picture to make the dimming screen perform backlight modulation on the display screen according to the second dimming picture and providing the second dimming picture to make the display screen display the input image according to the display picture. Of course, the above-mentioned program codes may also be stored in the same computer-readable medium, and the embodiments of the present disclosure do not limit this. For example, when the program codes are read by a computer, the computer may execute the program codes stored in the computer storage medium to perform, for example, the driving method of the display panel provided by any embodiment of the present disclosure.

For example, the computer-readable storage medium may be, but is not limited to, an electrical storage device, a magnetic storage device, an optical storage device, an electromagnetic storage device, a semiconductor storage device, or any suitable combination of the above devices. For example, the computer-readable storage media include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, and any suitable combination of the above.

For the present disclosure, the following statements should be noted:

(1) The accompanying drawings of the embodiments of the present disclosure involve only the structure(s) in connection with the embodiment(s) of the present disclosure, and other structure(s) can refer to common design(s).

(2) In case of no conflict, the features in the same embodiment and in different embodiments of the present disclosure can be combined with each other.

What have been described above are only exemplary implementations of the present disclosure, and is not intended to limit the scope of protection of the present disclosure, and the scope of protection of the present disclosure is determined by the appended claims.

What is claimed is:

1. A driving method of a display panel, wherein the display panel comprises a dimming screen and a display screen, and the dimming screen is provided at a backlight side of the display screen and is configured to perform backlight modulation on the display screen, the dimming screen comprises a plurality of dimming pixels, and the display screen comprises a plurality of display pixels, the driving method comprises:
- obtaining an input image that is to be displayed;
- determining a display picture corresponding to the plurality of display pixels of the display screen according to the input image;
- determining a first dimming picture corresponding to the plurality of dimming pixels of the dimming screen according to the input image, and processing the first dimming picture to obtain a second dimming picture;
- providing the display picture to make the dimming screen perform backlight modulation on the display screen according to the second dimming picture, and providing the second dimming picture to make the display screen display the input image according to the display picture, wherein processing the first dimming picture to obtain the second dimming picture comprises:
- determining white dimming pixels and black dimming pixels in the first dimming picture;
- determining a white dimming pattern, consisting of white dimming pixels and having a width less than or equal to L dimming pixels in a first direction, in the first dimming picture, wherein L is an integer greater than or equal to 2;
- performing brightness expansion processing on adjacent black dimming pixels that are adjacent to at least one side of the white dimming pattern in the first direction to adjust grayscale values of the adjacent black dimming pixels to obtain the second dimming picture.

2. The driving method according to claim 1, wherein determining the white dimming pattern, consisting of the white dimming pixels and having the width less than or equal to L dimming pixels in the first direction, in the first dimming picture, comprises:
- for any one target black dimming pixel in the first dimming picture, judging whether l consecutive dimming pixels that start from the target black dimming pixel in the first direction and are directly adjacent to each other along a same direction are all white dimming pixels and whether a (l+1)-th pixel is a black dimming pixel, if yes, determining a white dimming pattern consisting of the l consecutive dimming pixels and having a width of l dimming pixels in the first direction, wherein 1≤l≤L and l is an integer.

3. The driving method according to claim 1, wherein determining the white dimming pixels and the black dimming pixels in the first dimming picture, comprises:
- obtaining a first grayscale threshold;
- determining a dimming pixel with a grayscale value greater than or equal to the first grayscale threshold in the first dimming picture as a white dimming pixel, and determining a dimming pixel with a grayscale value less than the first grayscale threshold in the first dimming picture as a black dimming pixel.

4. The driving method according to claim 1, wherein determining the white dimming pixels and the black dimming pixels in the first dimming picture, comprises:
- obtaining a second grayscale threshold and a third grayscale threshold;
- determining a dimming pixel with a grayscale value greater than the second grayscale threshold in the first dimming picture as a white dimming pixel, and determining a dimming pixel with a grayscale value less than the third grayscale threshold in the first dimming picture as a black dimming pixel, wherein the second grayscale threshold is greater than the third grayscale threshold.

5. The driving method according to claim 1, wherein one pixel of the dimming screen corresponds to four adjacent display pixels of the display screen arranged in two rows and two columns, and L is equal to 3.

6. The driving method according to claim 1, wherein the adjacent black dimming pixels comprise a primary black dimming pixel, and the primary black dimming pixel is directly adjacent to the at least one side of the white dimming pattern in the first direction;
- performing brightness expansion processing on the adjacent black dimming pixels that are adjacent to the at least one side of the white dimming pattern in the first direction to adjust the grayscale values of the adjacent black dimming pixels, comprises:
- obtaining a primary grayscale value of the primary black dimming pixel and a plurality of grayscale values of a plurality of dimming pixels directly adjacent to the primary black dimming pixel as a plurality of reference primary grayscale values,
- obtaining a primary expansion coefficient corresponding to the primary black dimming pixel,
- based on the primary grayscale value, the plurality of reference primary grayscale values, and the primary expansion coefficient, obtaining a primary adjusted grayscale value for the primary black dimming pixel,
- assigning the primary adjusted grayscale value to the primary black dimming pixel.

7. The driving method according to claim 6, wherein obtaining the primary expansion coefficient corresponding to the primary black dimming pixel, comprises:
- obtaining a first coefficient as the primary expansion coefficient for a white dimming pattern with a width equal to one dimming pixel in the first direction;
- obtaining a second coefficient as the primary expansion coefficient for a white dimming pattern with a width equal to 2 dimming pixels in the first direction;
- obtaining a third coefficient as the primary expansion coefficient for a white dimming pattern with a width equal to 3 dimming pixels in the first direction.

8. The driving method according to claim 7, wherein the first coefficient, the second coefficient, and the third coefficient are 0.8, 0.8, and 0.9, respectively.

9. The driving method according to claim 6, wherein based on the primary grayscale value, the plurality of reference primary grayscale values, and the primary expansion coefficient, obtaining the primary adjusted grayscale value for the primary black dimming pixel, comprises:
- selecting a maximum primary grayscale value among the primary grayscale value and the plurality of reference primary grayscale values, and obtaining the primary adjusted grayscale value for the primary black dimming pixel based on the maximum primary grayscale value and the primary expansion coefficient.

10. The driving method according to claim 6, wherein the adjacent black dimming pixels further comprise a secondary black dimming pixel, the secondary black dimming pixel is directly adjacent to the primary black dimming pixel in the first direction and located at a side of the primary black dimming pixel away from the white dimming pattern;
- performing brightness expansion processing on the adjacent black dimming pixels that are adjacent to the at least one side of the white dimming pattern in the first direction to adjust the grayscale values of the adjacent black dimming pixels, further comprises:
obtaining a secondary grayscale value of the secondary black dimming pixel and a plurality of grayscale values of a plurality of dimming pixels directly adjacent to the secondary black dimming pixel as a plurality of secondary reference grayscale values,
obtaining a secondary expansion coefficient corresponding to the secondary black dimming pixel,
obtaining a secondary adjusted grayscale value for the secondary black dimming pixel, based on the secondary grayscale value, the plurality of secondary reference grayscale values, and the secondary expansion coefficient,
assigning the secondary adjusted grayscale value to the secondary black dimming pixel.

11. The driving method according to claim 10, wherein obtaining the secondary expansion coefficient corresponding to the secondary black dimming pixel, comprises:
obtaining a fourth coefficient as the secondary expansion coefficient for a white dimming pattern with a width equal to one dimming pixel in the first direction;
obtaining a fifth coefficient as the secondary expansion coefficient for a white dimming pattern with a width equal to 2 dimming pixels in the first direction;
obtaining a sixth coefficient as the secondary expansion coefficient for a white dimming pattern with a width equal to 3 dimming pixels in the first direction.

12. The driving method according to claim 11, wherein the fourth coefficient, the fifth coefficient, and the sixth coefficient are 0.6, 0.6, and 0.6, respectively.

13. The driving method according to claim 10, wherein obtaining the secondary adjusted grayscale value for the secondary black dimming pixel, based on the secondary grayscale value, the plurality of secondary reference grayscale values, and the secondary expansion coefficient, comprises:
selecting a maximum secondary grayscale value among the secondary grayscale value and the plurality of secondary reference grayscale values, and obtaining the secondary adjusted grayscale value for the secondary black dimming pixel based on the maximum secondary grayscale value and the secondary expansion coefficient.

14. The driving method according to claim 1, wherein the first direction is a row direction, a column direction, or a diagonal direction of pixels of the dimming screen.

15. The driving method according to claim 1, wherein before driving the dimming screen to perform backlight modulation on the display screen according to the second dimming picture and driving the display screen to display the input image according to the display picture, the driving method further comprises:
adjusting the display picture according to the second dimming picture to obtain an adjusted display picture, wherein the display screen displays the input image according to the adjusted display picture.

16. A driving device suitable for driving a display panel, wherein the display panel comprises a dimming screen and a display screen, and the dimming screen is provided at a backlight side of the display screen and is configured to perform backlight modulation on the display screen, the dimming screen comprises a plurality of dimming pixels, and the display screen comprises a plurality of display pixels,
the driving device comprises:
an image acquisition circuit, configured to acquire an input image that is to be displayed;
a display picture acquisition circuit, configured to determine a display picture corresponding to the plurality of display pixels of the display screen according to the input image;
a dimming picture acquisition circuit, configured to determine a first dimming picture corresponding to the plurality of dimming pixels of the dimming screen according to the input image and process the first dimming picture to obtain a second dimming picture;
an output circuit, configured to provide the display picture to make the dimming screen perform backlight modulation on the display screen according to the second dimming picture, and provide the second dimming picture to make the display screen display the input image according to the display picture,
wherein the dimming picture acquisition circuit being configured to process the first dimming picture to obtain the second dimming picture, comprises:
determining white dimming pixels and black dimming pixels in the first dimming picture;
determining a white dimming pattern, consisting of white dimming pixels and having a width less than or equal to L dimming pixels in a first direction, in the first dimming picture, wherein L is an integer greater than or equal to 2;
performing brightness expansion processing on adjacent black dimming pixels that are adjacent to at least one side of the white dimming pattern in the first direction to adjust grayscale values of the adjacent black dimming pixels to obtain the second dimming picture.

17. A driving device, comprising:
a processor;
a memory, storing computer-executable instructions,
wherein in a case where the computer-executable instructions are executed by the processor, the processor is caused to execute a driving method of a display panel,
the display panel comprises a dimming screen and a display screen, and the dimming screen is provided at a backlight side of the display screen and is configured to perform backlight modulation on the display screen, the dimming screen comprises a plurality of dimming pixels, and the display screen comprises a plurality of display pixels,
the driving method comprises:
obtaining an input image that is to be displayed;
determining a display picture corresponding to the plurality of display pixels of the display screen according to the input image;
determining a first dimming picture corresponding to the plurality of dimming pixels of the dimming screen according to the input image, and processing the first dimming picture to obtain a second dimming picture;
providing the display picture to make the dimming screen perform backlight modulation on the display screen according to the second dimming picture, and providing the second dimming picture to make the display screen display the input image according to the display picture,
wherein processing the first dimming picture to obtain the second dimming picture comprises:
determining white dimming pixels and black dimming pixels in the first dimming picture;

determining a white dimming pattern, consisting of white dimming pixels and having a width less than or equal to L dimming pixels in a first direction, in the first dimming picture, wherein L is an integer greater than or equal to 2;

performing brightness expansion processing on adjacent black dimming pixels that are adjacent to at least one side of the white dimming pattern in the first direction to adjust grayscale values of the adjacent black dimming pixels to obtain the second dimming picture.

18. A display device, comprising:

the driving device according to claim 16;

the display panel.

19. A computer-readable storage medium on which computer-executable instructions are stored, wherein the computer-executable instructions, when executed by a computer, cause the computer to execute the driving method according to claim 1.

20. The driving method according to claim 2, wherein determining the white dimming pixels and the black dimming pixels in the first dimming picture, comprises:

obtaining a first grayscale threshold;

determining a dimming pixel with a grayscale value greater than or equal to the first grayscale threshold in the first dimming picture as a white dimming pixel, and determining a dimming pixel with a grayscale value less than the first grayscale threshold in the first dimming picture as a black dimming pixel.

* * * * *

UNITED STATES PATENT AND TRADEMARK OFFICE
CERTIFICATE OF CORRECTION

PATENT NO. : 11,837,187 B2
APPLICATION NO. : 17/782281
DATED : December 5, 2023
INVENTOR(S) : Xi et al.

It is certified that error appears in the above-identified patent and that said Letters Patent is hereby corrected as shown below:

On the Title Page

Item (73) (Assignees) please change:
"BEIJING BOE OPTOELECTRONICS TECHNOLOGY PRESYCO.,LTD., Beijing (CN); BOE TECHNOLOGY GROUP CO.,LTD., Beijing(CN)"

To correctly read:
-- BEIJING BOE OPTOELECTRONICS TECHNOLOGY CO., LTD., Beijing (CN); BOE TECHNOLOGY GROUP CO., LTD., Beijing (CN) --

Signed and Sealed this
Twentieth Day of February, 2024

Katherine Kelly Vidal
*Director of the United States Patent and Trademark Office*